US011390764B2

(12) United States Patent
Zhou et al.

(10) Patent No.: US 11,390,764 B2
(45) Date of Patent: Jul. 19, 2022

(54) INKJET INKS

(71) Applicant: Hewlett-Packard Development Company, L.P., Spring, TX (US)

(72) Inventors: Zhang-Lin Zhou, San Diego, CA (US); Shao-Wei Li, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 433 days.

(21) Appl. No.: 16/617,539

(22) PCT Filed: Sep. 19, 2017

(86) PCT No.: PCT/US2017/052177
§ 371 (c)(1),
(2) Date: Nov. 27, 2019

(87) PCT Pub. No.: WO2019/059886
PCT Pub. Date: Mar. 28, 2019

(65) Prior Publication Data
US 2020/0123400 A1   Apr. 23, 2020

(51) Int. Cl.
*C09D 11/322* (2014.01)
*C08F 293/00* (2006.01)
*C08K 3/013* (2018.01)
*C08K 3/36* (2006.01)
*C08K 5/00* (2006.01)
*C08K 5/56* (2006.01)
*C08K 9/08* (2006.01)
*C08K 3/22* (2006.01)

(52) U.S. Cl.
CPC ........ *C09D 11/322* (2013.01); *C08F 293/005* (2013.01); *C08K 3/013* (2018.01); *C08K 3/36* (2013.01); *C08K 5/0041* (2013.01); *C08K 5/56* (2013.01); *C08K 9/08* (2013.01); *C08K 2003/2227* (2013.01); *C08K 2003/2241* (2013.01); *C08K 2003/2268* (2013.01); *C08K 2003/2296* (2013.01)

(58) Field of Classification Search
CPC ............... C09D 11/322; C09D 153/005; C08F 293/005; C08K 3/013
USPC .................................................. 523/160, 161
See application file for complete search history.

(56) References Cited

U.S. PATENT DOCUMENTS

| 4,880,432 | A | 11/1989 | Egan et al. |
| 6,103,006 | A | 8/2000 | DiPietro |
| 7,838,574 | B2 | 11/2010 | Ma et al. |
| 7,893,152 | B2 | 2/2011 | Palumbo et al. |
| 8,153,706 | B2 | 4/2012 | Vasudevan |
| 8,363,306 | B2 | 1/2013 | Du et al. |
| 8,546,502 | B2 | 10/2013 | Shimanaka et al. |
| 2007/0125260 | A1* | 6/2007 | Grimm ............... C09D 7/45 106/496 |
| 2008/0122915 | A1* | 5/2008 | Madaras ............. C09D 11/32 347/100 |
| 2010/0061951 | A1 | 3/2010 | Sujeeth et al. |
| 2010/0317819 | A1 | 12/2010 | De Keyzer et al. |
| 2012/0300284 | A1* | 11/2012 | Zhou ................. C09D 11/36 524/544 |
| 2015/0036207 | A1* | 2/2015 | Zhou ............... G02F 1/133348 524/548 |
| 2017/0283640 | A1 | 10/2017 | Van Hout et al. |

FOREIGN PATENT DOCUMENTS

| JP | 2008145713 | 6/2008 |
| WO | 2013109250 | 7/2013 |

OTHER PUBLICATIONS

Van Camp et al., From Novel Block-Like Copolymers to Reactive Nanoparticles: ATRP and "Click" Chemistry as Synthetic Tools, Abstract, New Smart Materials via Metal Mediated Macromolecular Engineering, NATO Science for Peace and Security Series A: Chemistry and Biology, Springer Science+Business Media B.V., 2009.
Liu et al., Perfluorophenyl Azides: New Applications in Surface Funcionalization and Nanomaterial Synthesis, Abstract, Accounts of Chemical Research, 43 (11), pp. 1434-1443, 2010.
Yoshikawa et al., Grafting of living polymer cations with organic pigments, Abstract, Elsevier, Progress in Organic Coatings, vol. 31, Issues 1-2, 1997, pp. 127-131.
International Search Report dated Sep. 19, 2017 for PCT/US2017/052177, Applicant Hewlett-Packard Development Company, L.P.

\* cited by examiner

*Primary Examiner* — Doris L Lee
(74) *Attorney, Agent, or Firm* — Thorpe North & Western LLP

(57) ABSTRACT

The present disclosure is drawn inkjet inks, which can include an aqueous ink vehicle and a pigment particle having a block copolymer attached to a surface of the pigment particle. The block copolymer can be linked to the surface through a nitrogen atom-containing coupling group bonded to the surface through the nitrogen atom. The block copolymer can include a steric stabilizing block formed by polymerizing a monomer having a sterically bulky group, and an ionic stabilizing block formed by polymerizing a monomer having an acidic group or a basic group.

15 Claims, 12 Drawing Sheets

INKJET INKS

BACKGROUND

There are several reasons that inkjet printing has become a popular way of recording images on various media surfaces. Some of these reasons include low printer noise, variable content recording, capability of high speed recording, and multi-color recording. Additionally, these advantages can be obtained at a relatively low price to consumers. In a typical inkjet printing process, droplets of liquid ink are jetted from thermal or piezo inkjet architecture onto a print medium such as paper. The ink often includes water and/or organic solvents, which are absorbed by the print medium. Eventually, the solvents evaporate leaving a dry printed image.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Figure 1:
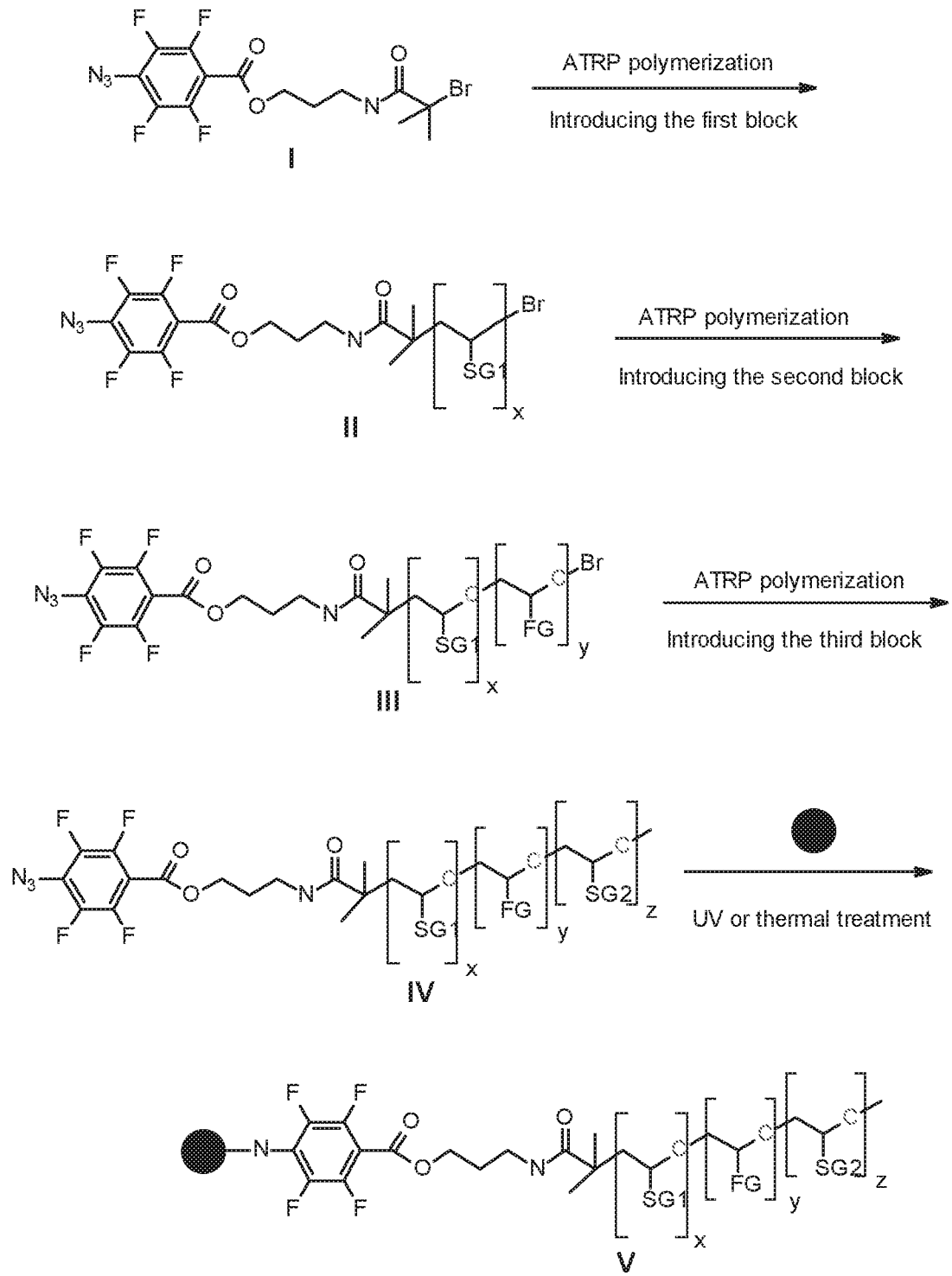
FIG. 1 is an example reaction scheme for forming a block copolymer attached to a pigment particle in accordance with the present disclosure.

Reference will now be made to several examples that are illustrated herein, and specific language will be used herein to describe the same. It will nevertheless be understood that no limitation of the scope of the disclosure is thereby intended.

DETAILED DESCRIPTION

The present disclosure is drawn to inkjet inks, inkjet printing systems, and inkjet printing methods. The inkjet inks described herein can include an aqueous ink vehicle and a pigment particle having a block copolymer attached to a surface of the pigment particle. The block copolymer can be linked to the surface through a nitrogen atom-containing coupling group bonded to the surface through the nitrogen atom. The block copolymer can be made up of a steric stabilizing block formed by polymerizing a monomer having a sterically bulky group, and an ionic stabilizing block formed by polymerizing a monomer having an acidic group or a basic group.

In a particular example, the block copolymer can be a diblock copolymer that includes an inner ionic stabilizing group and an outer steric stabilizing group. As used here, "inner" refers to a block that is closer to the surface of the pigment particle and "outer" refers to a block that is more distant from the surface of the pigment particle. In another example, the block copolymer can be a triblock copolymer that includes an inner steric stabilizing group, a middle ionic stabilizing group, and an outer steric stabilizing group. In further examples, the block copolymer linked to the nitrogen atom-containing coupling group can have general formula 1, general formula 2, or general formula 3, as shown below:

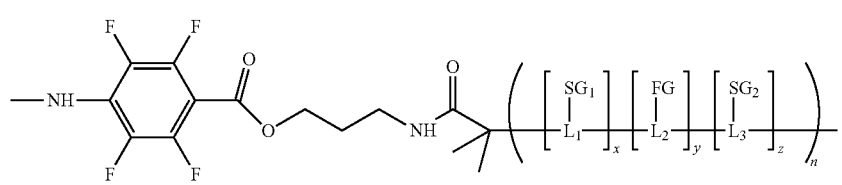

(1)

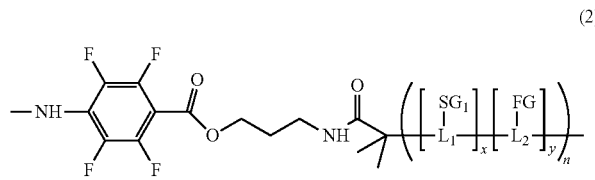

(2)

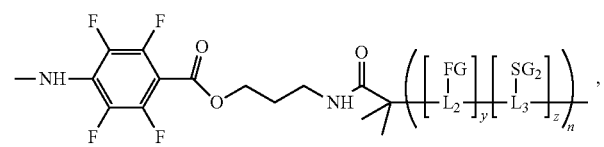

(3)

where $L_1$, $L_2$, and $L_3$ are each independently a covalent bond or chemical structure providing a covalent bond between different blocks selected from C—C, C=C, or C—N, $SG_1$ and $SG_2$ each independently represent a solubilizing and sterically bulky group, which helps to increase the solubility of the polymer and stabilize the colorant particles, selected from alkyl groups, alkoxy groups, branched alkyl groups, branched alkoxy groups, aliphatic esters, branched aliphatic esters, substituted phenyl groups, or macromolecular monomers; FG represents a functional group that provides charging sites to pigment surfaces, selected from acidic functional groups and basic groups; and x, y and z are each independently an integer from 1 to about 5,000; and n is an integer from 1 to about 100. In another example, the acidic or basic group in the monomer of the ionic stabilizing block can be a hydroxyl, a carboxylate, a sulfonic acid, a phosphonic acid, a phosphorous acid, a primary amine, a secondary amine, a tertiary amine, pyridine, or imidazoline. In further examples, the monomer of the steric stabilizing block can be:

where m is an integer from 1 to 10 and n is an integer from 1 to 500. In still further examples, the monomer of the steric stabilizing block can be:

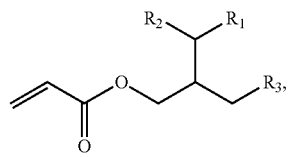

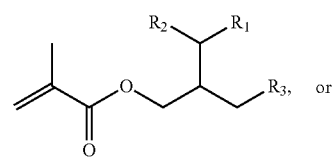

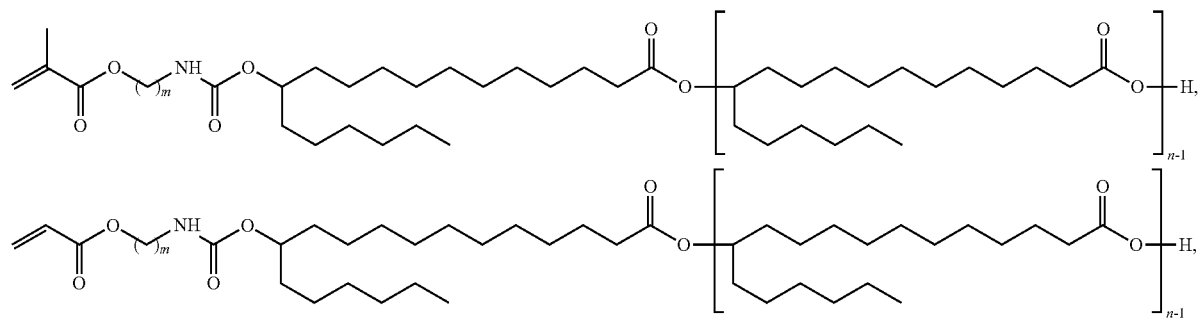

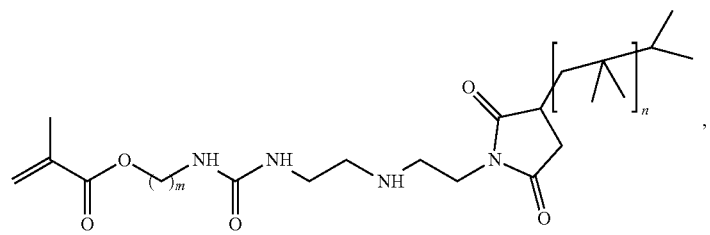

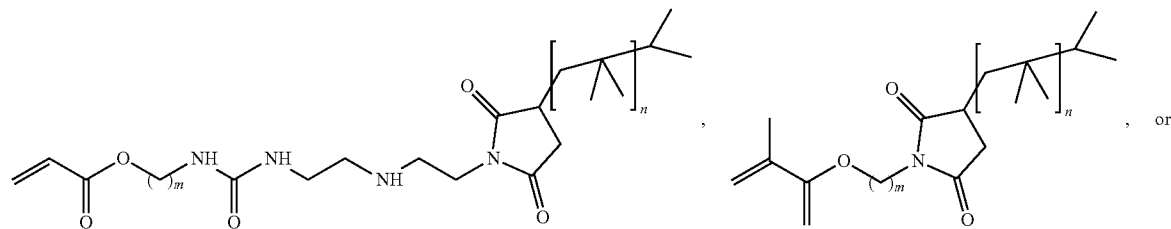

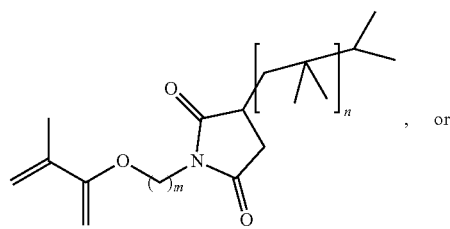

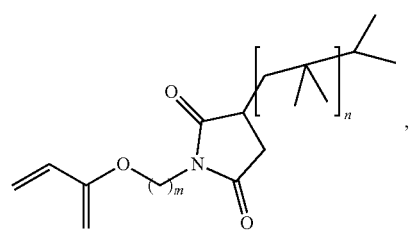

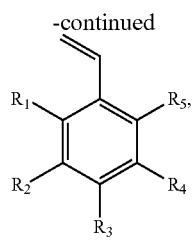

where $R_1$, $R_2$, $R_3$, $R_4$, and $R_5$ are independently alkyl groups, alkoxy groups, branched alkyl groups, branched alkoxy groups, or substituted aryl groups. In yet another example, the inkjet ink can include a binder. In certain examples, the binder can include a polyurethane dispersion or a latex dispersion. In another example, the binder can be curable with ultraviolet radiation and can include a photoinitiator.

In other example of the present disclosure, an inkjet printing system can include an intermediate transfer member, an inkjet ink, and an inkjet printhead positioned to jet the inkjet ink onto the intermediate transfer member. The inkjet ink can include an aqueous ink vehicle and a pigment particle having a block copolymer attached to a surface of the pigment particle. The block copolymer can be linked to the surface through a nitrogen atom-containing coupling group bonded to the surface through the nitrogen atom, and the block copolymer can include a steric stabilizing block formed by polymerizing a monomer having a sterically bulky group, and an ionic stabilizing block formed by polymerizing a monomer having an acidic group or a basic group. In a particular example, the intermediate transfer member can include a non-absorbent surface on which the inkjet ink is printed. In another example, the intermediate transfer member can be heated.

The present disclosure is also drawn to a method of inkjet printing, and can include jetting an inkjet ink onto an intermediate transfer member to form an image, and transferring the image from the intermediate transfer member to a print medium. The inkjet ink can include an aqueous ink vehicle and a pigment particle having a block copolymer attached to a surface of the pigment particle. The block copolymer can be linked to the surface through a nitrogen atom-containing coupling group bonded to the surface through the nitrogen atom and the block copolymer can include a steric stabilizing block formed by polymerizing a monomer having a sterically bulky group, and an ionic stabilizing block formed by polymerizing a monomer having an acidic group or a basic group. In a particular example, the intermediate transfer member can be heated to dry the image.

The inkjet inks can be suitable in various methods, such as "transfer printing" or "offset printing," because the image may be first printed on an intermediate transfer member and then transferred onto the final print medium. In particular, inkjet inks and the methods described herein can involve using an inkjet process to jet ink onto the intermediate transfer member to form the image. The image can then be at least partially dried on the intermediate transfer member before being transferred to the print medium.

Transfer inkjet printing methods can provide several advantages over inkjet printing in which the ink is jetted directly onto the print medium. In traditional inkjet printing processes, ink can be jetted directly onto a print medium, such as paper, where the ink is allowed to dry to form the final printed image. Several variables can potentially affect the final image quality of the printed image. When ink is printed onto paper in a liquid state, the paper can absorb water and/or organic solvents in the ink. However, colorant in the ink can often be absorbed along with the solvents so that a significant portion of the colorant travels below the surface of the paper. Thus, the optical density of the printed image can be less than if all of the colorant had remained at the top surface of the paper. Additionally, absorbing solvents into paper can lead to issues with drying time and paper curling. When used with nonabsorbent print media such as polymeric films, direct inkjet printing can have problems with adherence of the ink to the media, beading of the ink on the media, and durability of the printed image. These problems have led to development of a wide variety of specialty print media with specialized coatings attempting to solve one or more of these issues.

In the transfer inkjet printing methods described herein, the ink can be jetted first onto an intermediate transfer member. In some examples, the ink can then be partially or completely dried on the intermediate transfer member. When the dried image is transferred onto the final print media, all of the colorant in the ink can remain at the top surface of the print media because the colorant is not carried below the surface of the print media by solvents in the ink. Thus, the final printed image can have a high optical density. The ink can also form a durable film on the intermediate transfer member before being transferred to the print medium. Thus, the printed image can have high durability. In some examples, the ink can be curable and the printed image can be cured either before or after the image is transferred to the final print medium.

Inkjet inks have often included an amount of dispersant or surfactant that increases the dispersability of pigment particles used to color the inks. Although these dispersants and surfactants provide satisfactory ink performance in traditional inkjet printing processes, the dispersants and surfactants can interfere with the transfer inkjet printing processes described herein. In particular, dispersants and surfactants in the ink can contaminate the surface of the intermediate transfer member, which can lead to image transfer failure. Additionally, large amounts of dispersants and surfactants in the ink can reduce the durability of the final printed image.

Accordingly, the inkjet ink compositions described herein can include pigments with attached block copolymers that stabilize the pigment particles in the ink. The block copolymers can make the pigment sufficient dispersible in the ink so that no additional dispersant is necessary. Accordingly, in some examples the inkjet ink compositions can be devoid of additional dispersants and surfactants, or can include only a small amount of additional dispersant and surfactant, e.g., less than 1 wt %, less than 0.5 wt %, less than 0.1 wt %, less than 0.05 wt %. This can reduce degradation of the intermediate transfer member used in the transfer inkjet printing process.

The pigment particles having attached block copolymers can also be more durable than pigment particles dispersed with a separate dispersant. The block copolymers can be covalently attached to the surfaces of the pigment particles so that the pigment particles are fully encapsulated. This can provide more protection for the pigment particles compared to separate dispersants, which can desorb from the pigment surface. When separate dispersants are used in ink, a relatively large amount of dispersant is often used because the dispersant adsorbed to surfaces of the pigment particles is in equilibrium with free dispersant in the liquid vehicle of the ink. Using larger amounts of dispersants can negatively impact the intermediate transfer member, as mentioned above, and can also reduce the jet-ability of the ink.

In some examples, the block copolymers can be formed in a step-wise fashion. Discrete blocks of the copolymers can be attached to a coupling agent molecule, and then the coupling agent can be attached to a pigment particle surface. Each block of the block copolymers can be designed to optimize its intended function in the system based on the specific particle chemistry, solvent choice, and other system requirements. For example, one block of the block copolymer can be designed to provide the best compatibility to the particle surface chemistry while exhibiting adequate solubility in an aqueous environment. Another portion can be designed to achieve a charge functionality in combination with the particle chemistry and other additives. Another portion can provide steric stabilization to prevent agglomeration to fulfil requirements of the printing system. The inkjet ink compositions based on such pigment particles containing covalently attached dispersants can be very stable because both the charge-producing and steric stabilization groups are covalently bonded to the pigment surface.

In certain examples, an inkjet ink can include an aqueous ink vehicle and a pigment particle having a block copolymer attached to a surface of the pigment particle. The block copolymer can be linked to the surface of the pigment particle through a nitrogen atom-containing coupling group bonded to the surface through the nitrogen atom. The block copolymer can include: a sterically stabilizing block formed by polymerizing a monomer having a sterically bulky group, and an ionic stabilizing block formed by polymerizing a monomer having an acidic group or a basic group.

The nitrogen atom-containing coupling groups described herein can be formed by bonding an azide-containing coupling agent to the pigment particle surface. For example, the block copolymer can be formed on an azide-containing coupling agent. The azide group can then react with the surface of the pigment particle, resulting in a single nitrogen atom from the azide group becoming bonded to the surface of the pigment particle. This nitrogen atom and the remainder of the original coupling agent molecule can be referred to as the "nitrogen atom-containing coupling group."

In a particular example, the block copolymer can be a diblock copolymer, meaning that the copolymer can include two blocks. One of the blocks can be a sterically stabilizing block and the other block can be an ionic stabilizing block. In another particular example, the block copolymer can be a triblock copolymer. The triblock copolymer can include one sterically stabilizing block and two ionic stabilizing blocks, or two sterically stabilizing blocks and one ionic stabilizing block. In further examples, the block copolymer can include any number of additional blocks. In some examples, the block copolymer can include at least one steric stabilizing block and at least one ionic stabilizing block.

In various examples that have multiple sterically stabilizing blocks, the sterically stabilizing blocks can be made up of the same monomers or different monomers. For example, a first sterically stabilizing block can be formed by polymerizing a first monomer that contains a sterically bulky group. Then, a second sterically stabilizing block can be formed by polymerizing a second monomer containing a sterically stabilizing group. The first and second monomers can be the same in some examples, or different in other examples. Similarly, when multiple ionic stabilizing blocks are used, the multiple ionic stabilizing blocks can be formed of the same or different monomers.

The location of the various blocks in the block copolymer with respect to the pigment particle can be determined by the order in which the blocks are polymerized and attached to the azide-containing coupling agent. When the coupling agent bonds to the surface of the pigment particle, the closer blocks to the coupling agent end up closer to the pigment particle surface. For example, a first block can be polymerized adjacent to the azide-containing coupling agent. A second block can then polymerized attached to the end of the first block, so that the second block is separated from the coupling agent by the first block. In this example, the first block can be referred to as an "inner block" and the second block can be referred to as an "outer block." In this case, the inner block acts as an inner layer of the coating encapsulating the pigment particle, and the outer block acts as an outer layer of the coating. In another example, a third block can be polymerized attached to the second block. In this case, the first block is referred to as an "inner block," the second block is referred to as a "middle block" and the third block is referred as an "outer block."

In some examples, sterically stabilizing blocks can be formed from known or commercially available dispersants. Many dispersants are large molecules that can provide the steric stabilizing function desired in the sterically stabilizing block. Some known and commercially available dispersants can be converted into monomers that are suitable for polymerization in the block copolymers described herein. Accordingly, in some examples, a sterically stabilizing block can be made up of dispersant molecules that have been converted into monomers and then polymerized to form the sterically stabilizing block. Steps for such conversions are described in more detail below.

The block copolymers described herein can be formed by ATRP (Atom Transfer Radical Polymerization), which is a living polymerization method. ATRP often uses an organic halide as an initiator. The halide atom can be transferred to the end of the polymer chain as monomers are polymerized. In some examples described herein, the azide-containing coupling agent can also include a halide group to act as an initiator. Once the block copolymer has been completely polymerized attached to the azide-containing coupling agent, the azide group can react with the surface of the pigment particle to bond the block copolymer to the pigment particle.

In polymer chemistry, living polymerization is a form of addition polymerization where the ability of a growing polymer chain to terminate has been removed. This can be accomplished in a variety of ways. Chain termination and chain transfer reactions are absent and the rate of chain initiation is also much larger than the rate of chain propagation. The result is that the polymer chains grow at a more constant rate than seen in traditional chain polymerization and chain lengths remain very similar (i.e. they have a very low polydispersity index). Living polymerization is a popular method for synthesizing block copolymers since the polymer can be synthesized in stages, each stage containing a different monomer. Additional advantages can include predetermined molar mass and control over end groups.

In ATRP, the uniform polymer chain growth, which leads to low polydispersity, stems from use of a transition metal-based catalyst. This catalyst provides an equilibrium between active, and therefore propagating, polymer and an inactive form of the polymer, known as the dormant form. Since the dormant state of the polymer is vastly preferred in this equilibrium, side reactions are suppressed. This equilibrium in turn lowers the concentration of propagating radicals, therefore suppressing unintentional termination and controlling molecular weights. ATRP reactions can be very robust in that they are tolerant of many functional groups such as allyl, amino, epoxy, hydroxy, and vinyl groups present in either the monomer or the imitator. ATRP methods may also be advantageous due to the ease of preparation, commercially available and inexpensive catalysts such as copper complexes, pyridine based ligands, and initiators such as alkyl halides.

FIG. 1 shows an example reaction scheme for forming a block copolymer attached to a pigment particle as described herein. In the first step of the reaction, an azide-containing coupling agent (I) is reacted with a monomer containing the sterically bulky group $SG_1$ to form a first coupling agent-attached polymer (II). A second monomer containing the ionic group FG is then polymerized to give a coupling agent-attached diblock copolymer (III). A third monomer containing the sterically bulky group $SG_2$ is then polymerized to give a coupling agent-attached triblock copolymer (IV). The azide group of the coupling agent can then react with the surface of a pigment particle to give a block copolymer grafted pigment particle (V).

In the example of FIG. 1, FG can be an oligomer or functional group that provides charging sites/charges to pigment surfaces, such as an oligomer or monomeric moiety that contains acidic or basic groups listed below. Examples of acidic functional group can include hydroxyl, carboxylate, a sulfonic acid, a phosphonic acid, a phosphorous acid, and so on. Examples of a basic group can include primary amine, secondary amine, tertiary amine, pyridine, imidazoline, and so on. Specific examples can include oligomers or monomers of (meth)acrylic acid, 2-sulfoethyl methacrylate, dimethylamino ethyl (meth)acrylate, diethylamino ethyl styrene. $SG_1$ and $SG_2$ can represent a known dispersant and/or a solubilizing and sterically bulky group, which helps to increase the solubility of the polymer and stabilize the pigment particles. In some examples, the sterically bulky group can be any alkyl group, alkoxy group, branched alkyl groups, branched alkoxy groups, polyethylene glycol groups, polypropylene glycol groups, polyethylene glycol ester groups, polypropylene glycol ester groups, and such groups substituted on phenyl groups. X, y and z are integers between 1 and about 5,000.

It should be noted that FIG. 1 is only one example and the block copolymers described herein are not limited to the formula shown in FIG. 1. In some more general examples, the block copolymer can have the following structure:

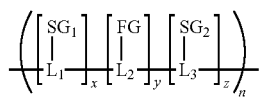

where $L_1$, $L_2$, and $L_3$ can be a covalent bond or a chemical structure providing a covalent bond between different blocks, such as C—C, C=C, or C—N. $SG_1$, $SG_2$, and FG can represent any of the groups described above in relation to general formulas 1-3. x, y, and z can be integers from 1 to about 5,000, and n can be an integer from 1 to about 100.

In further examples, the block copolymer can include a single sterically stabilizing group (i.e., either $SG_1$ or $SG_2$) and a single ionic stabilizing group. In other examples, the block copolymer can include multiple different sterically stabilizing and ionic stabilizing groups.

In further examples, the block copolymer attached to the coupling agent can have one of the following structures:

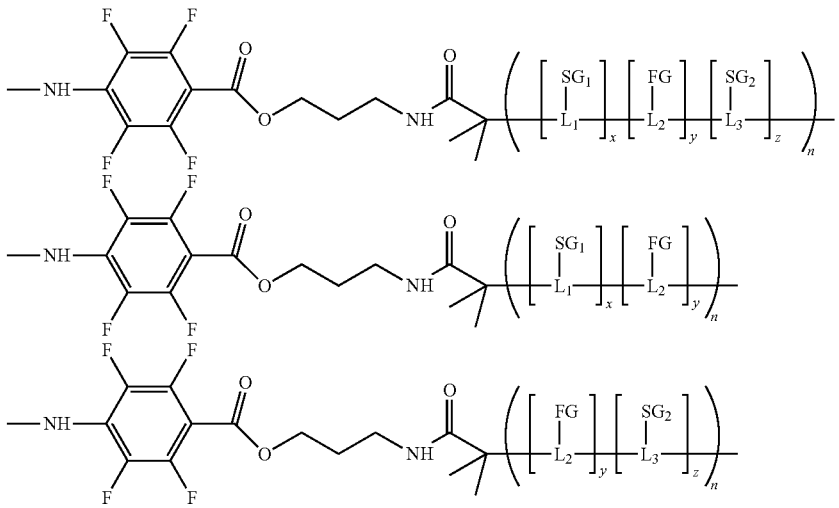

In these examples, the coupling agent can attach to the surface of the pigment particle through the nitrogen atom at the end of the coupling agent. Furthermore, $L_1$, $L_2$, and $L_3$ can be a covalent bond or a chemical structure providing a covalent bond between different blocks, such as C—C, C=O, or C—N. $SG_2$, and FG can represent any of the groups described above in relation to general formulas 1-3. x, y, and z can be integers from 1 to about 5,000, and n can be in integer from 1 to about 100.

Figure 2:
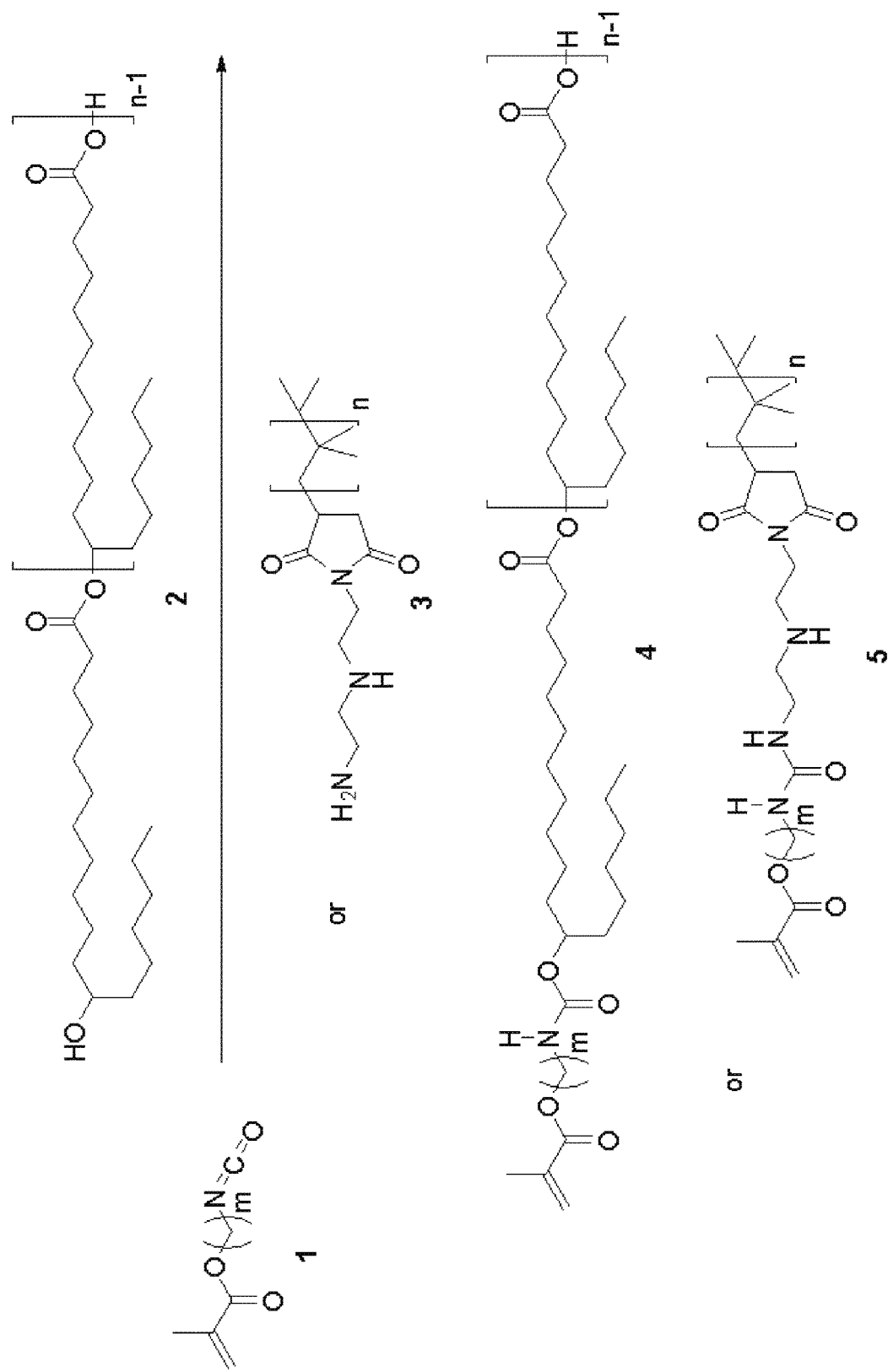
FIG. 2 is an example reaction scheme for converting dispersants into polymerizable monomers for use in making block copolymers in accordance with the present disclosure.

FIG. 2 shows an example reaction scheme for converting molecules that have previously been used as dispersant into polymerizable monomers for use in making the block copolymers described herein. In this example, 2-methyl-2-propenoic acid isocyanatoalkyl ester (1) is reacted with dispersant 2 or dispersant 3 to give polymerizable monomer 4 or 5, respectively.

Figure 3:
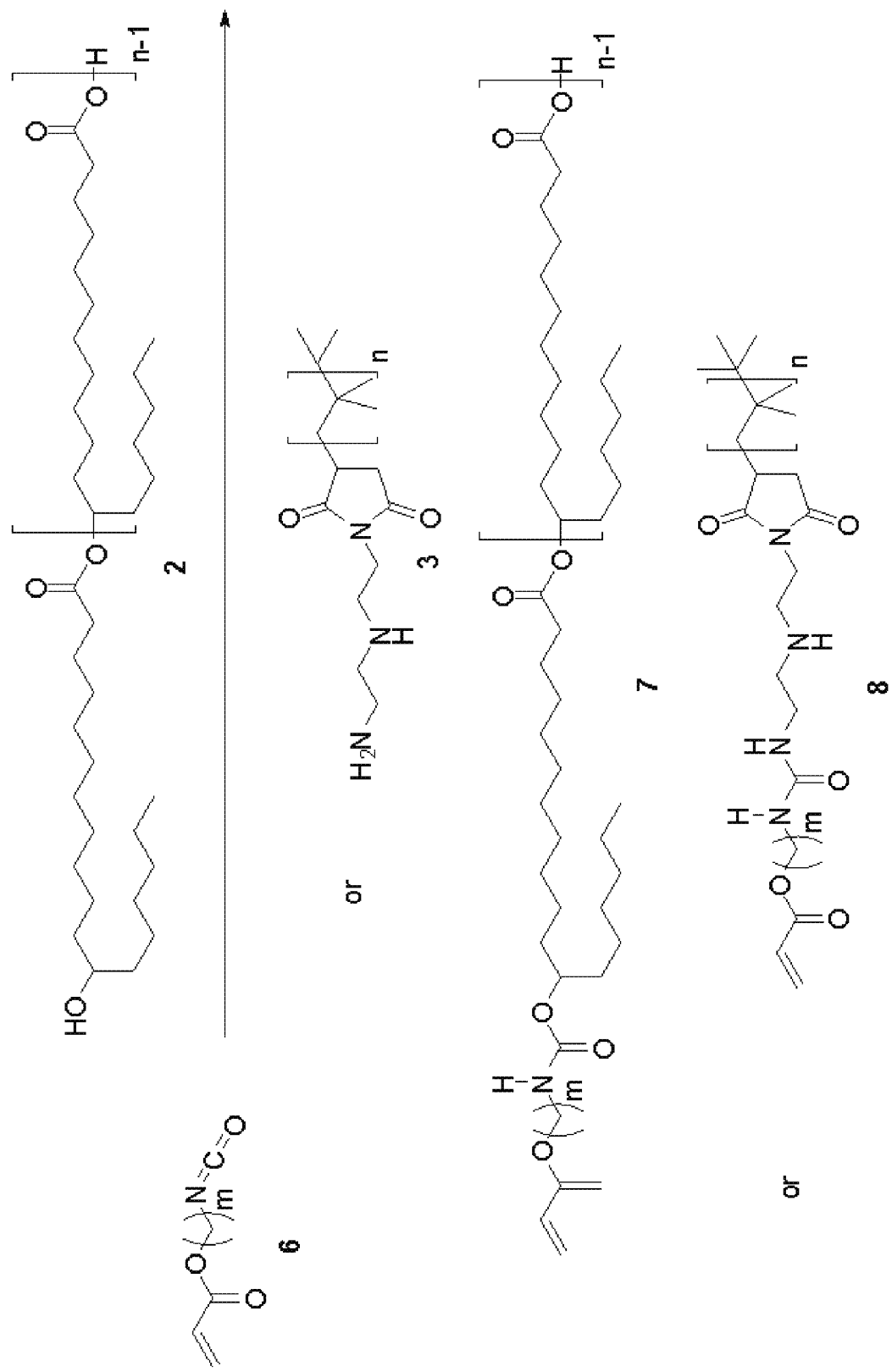
FIG. 3 is an example reaction scheme for converting dispersants into polymerizable monomers for use in making block copolymers in accordance with the present disclosure.

FIG. 3 shows another example reaction scheme in which 2-propenoic acid isocyanatoalkyl ester (6) is reacted with dispersant 2 or 3 to give polymerizable monomer 7 or 8, respectively.

Figure 4:
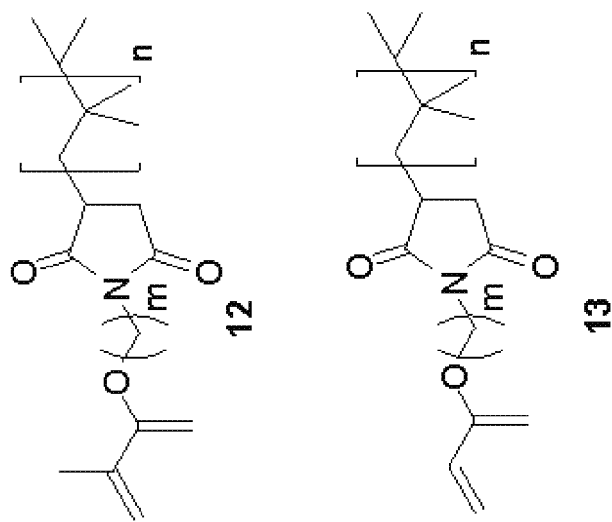
FIG. 4 is an example reaction scheme for converting dispersants into polymerizable monomers for use in making block copolymers in accordance with the present disclosure.
Figure 4:
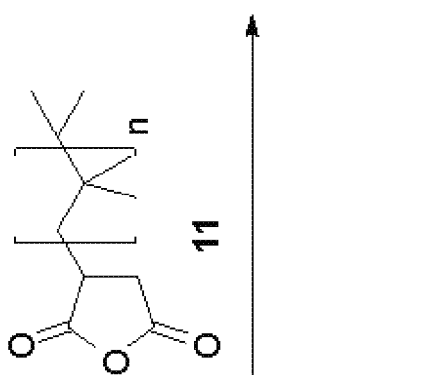
Figure 4:
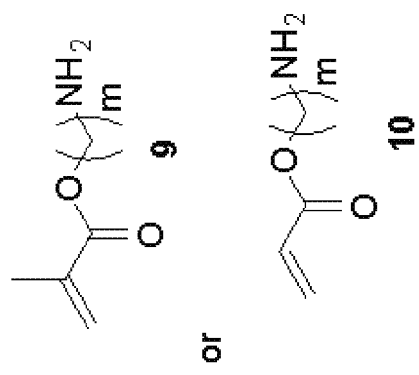

FIG. 4 shows another example reaction scheme in which 2-methyl-2-propenoic acid aminoalkyl ester (9) or 2-propenoic acid aminoalkyl ester (10) are reacted with dispersant 11 to give polymerizable monomers 12 or 13, respectively.

In the examples of FIGS. 2-4, m can represent an integer from 1 to 10 and n can represent an integer from 1 to 500. Any of the polymerizable monomers shown in FIGS. 2-4 can be examples of the monomers containing $SG_1$ or $SG_2$ groups used to make block copolymers described herein.

Additional non-limiting examples of sterically stabilizing monomers can include the following structures:

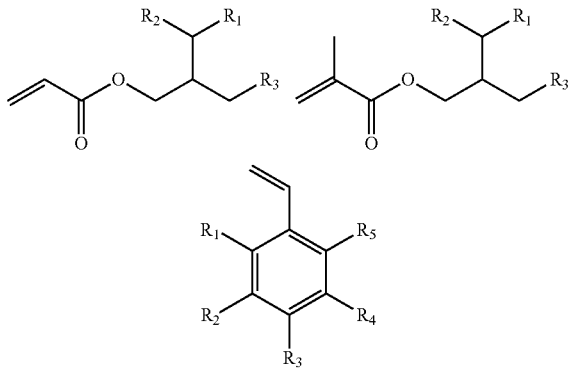

where $R_1$, $R_2$, $R_3$, $R_4$, and $R_5$ are independently alkyl groups, alkoxy groups, branched alkyl groups, branched alkoxy groups, or substituted aryl groups.

Non-limiting examples of ionic stabilizing monomers can include the following structures:

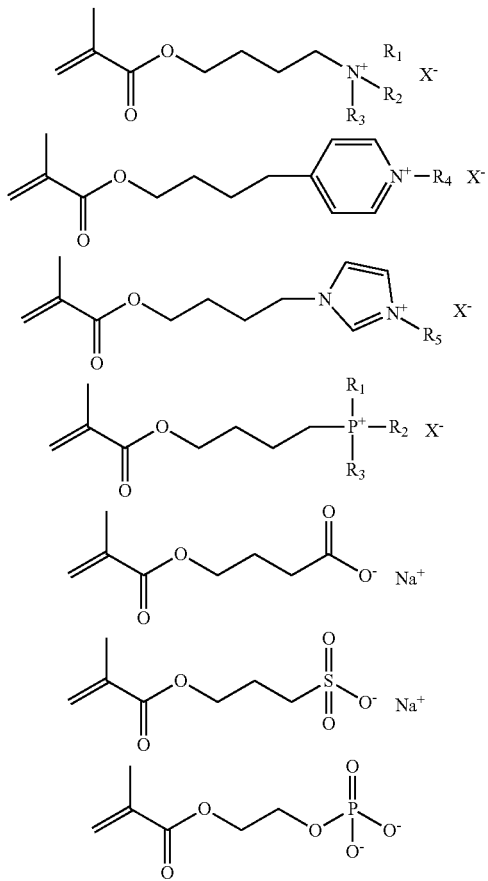

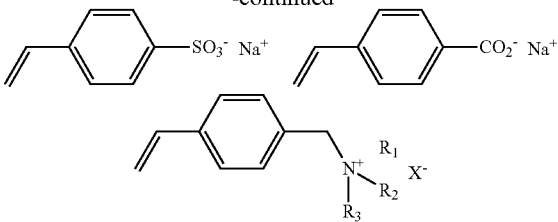

where $R_1$, $R_2$, $R_3$, $R_4$, and $R_5$ are independently alkyl groups, alkoxy groups, branched alkyl groups, branched alkoxy groups, or substituted aryl groups and X— is an anion.

As mentioned above, the inkjet inks described herein can include the pigment particles attached to block copolymers and an aqueous vehicle. Additionally, in some examples the inkjet ink can include a binder. In certain examples, the binder can be either a curable or a non-curable polyurethane or latex binder. In further examples, the binder that is dispersed in an inkjet ink composition can be present in the inkjet ink composition an amount of 0.1 wt % to 30 wt %, or from 0.1 wt % to 20 wt %, or 0.1 to 10 wt %, or 0.5 wt % to 7 wt %, or 0.6 wt % to 5 wt %, for example, of the total weight of the inkjet ink composition.

In another example, the aqueous vehicle can include water. Water may be present in the inkjet ink composition in an amount of at least 30 wt %, for example, at least 40 or 50 wt %. In some examples, water may be present in the inkjet ink composition in an amount of at least 60 wt %. In further examples, water may be present in an amount of at most 99 wt %, for example, at most 95 wt %. In some examples, water may be present in the inkjet ink composition in an amount of 30 to 99 wt %, for instance, 40 to 98 wt % or 50 to 95 wt %. In other examples, water may be present in an amount of 60 to 93 wt %, for instance, 70 to 90 wt %.

The inkjet ink composition may also include a surfactant. Any suitable surfactant may be present. Suitable surfactants may include non-ionic, cationic, and/or anionic surfactants. Examples include a silicone-free alkoxylated alcohol surfactant such as, for example, TECO® Wet 510 (Evonik Tego Chemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylated acetylenic diol), SURFYNOL® CT 211 (non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL™ TMN-3 and TERGITOL™ TMN-6 (both of which are branched secondary alcohol ethoxylate, non-ionic surfactants), and TERGITOL™ 15-S-3, TERGITOL™ 15-S-5, and TERGITOL™ 15-S-7 (each of which is a secondary alcohol ethoxylate, non-ionic surfactant) (all of the TERGITOL™ surfactants are available from The Dow Chemical Co.). Fluorosurfactants may also be employed.

When present, the surfactant can be present in the inkjet ink in an amount ranging from about 0.01 wt % to about 5 wt % based on the total wt % of the inkjet ink. As mentioned above, the block copolymer grafted pigment particles described herein can reduce the need for additional surfactant in the ink, so in some examples the ink can be devoid of surfactant. In further examples, the ink can include a minimal amount of surfactant, such as from about 0.01 wt % to about 0.5 wt % based on the total weight of the inkjet ink.

The inkjet ink composition may also include a co-solvent in addition to water. Classes of co-solvents that may be used can include organic co-solvents, including alcohols (e.g., aliphatic alcohols, aromatic alcohols, polyhydric alcohols (e.g., diols), polyhydric alcohol derivatives, long chain alcohols, etc.), glycol ethers, polyglycol ethers, a nitrogen-containing solvent (e.g., pyrrolidinones, caprolactams, formamides, acetamides, etc.), and a sulfur-containing solvent. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. Still other examples of suitable co-solvents include propylene carbonate and ethylene carbonate.

A single co-solvent may be used, or several co-solvents may be used in combination. When included, the co-solvent(s) is/are present in total in an amount ranging from 0 wt % to 60 wt %, depending on the jetting architecture, though amounts outside of this range can also be used. As other examples, the co-solvent(s) may range from about 1 wt % to about 30 wt % or to about 20 wt % of the total weight of the inkjet ink composition.

The inkjet ink composition may also include various other additives to enhance the properties of the ink composition for specific applications. Examples of these additives include those added to inhibit the growth of microorganisms, viscosity modifiers, materials for pH adjustment, sequestering agents, anti-kogation agents, preservatives, and the like. Such additives may be present in an amount of 0 to 5 wt % of the inkjet composition.

The inkjet composition can also include the pigment dispersion based on block copolymer grafted pigments described above. In some examples, the block copolymer grafted pigment particles can be present in an amount from about 0.5 wt % to about 15 wt % based on a total wt % of the inkjet ink composition. In one example, the block copolymer grafted pigment particles can be present in an amount from about 1 wt % to about 10 wt %. In another example, the block copolymer grafted pigment particles can be present in an amount from about 5 wt % to about 10 wt %.

As used herein, "pigment" generally includes organic or inorganic pigment colorants, magnetic particles, aluminas, silicas, and/or other ceramics, organo-metallics or other opaque particles, whether or not such particulates impart color. Thus, although the present description primarily illustrates the use of pigment colorants, the term "pigment" can be used more generally to describe pigment colorants, as well as other pigments such as organometallics, ferrites, ceramics, etc.

Suitable pigments include the following, which are available from BASF Corp.: PALIOGEN® Orange, HELIOGEN® Blue L 6901F, HELIOGEN® Blue NBD 7010, HELIOGEN® Blue K 7090, HELIOGEN® Blue L 7101F, PALIOGEN® Blue L 6470, HELIOGEN® Green K 8683, HELIOGEN® Green L 9140, CHROMOPHTAL® Yellow 3G, CHROMOPHTAL® Yellow GR, CHROMOPHTAL® Yellow 8G, IGRAZIN® Yellow SGT, and IGRALITE® Rubine 4BL. The following pigments are available from Degussa Corp.: Color Black FWI, Color Black FW2, Color Black FW2V, Color Black 18, Color Black, FW200, Color Black 5150, Color Black S160, and Color Black 5170. The following black pigments are available from Cabot Corp.: REGAL® 400R, REGAL® 330R, REGAL® 660R, MOGUL® L, BLACK PEARLS® L, MONARCH® 1400, MONARCH® 1300, MONARCH® 1100, MONARCH® 1000, MONARCH® 900, MONARCH® 880, MONARCH® 800, and MONARCH® 700. The following pigments are available from Orion Engineered Carbons GMBH: PRINTEX® U, PRINTEX® V, PRINTEX® 140U, PRINTEX® 140V, PRINTEX® 35, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: TI-PURE® R-101. The following pigments are available from Heubach: MONASTRAL® Magenta, MONASTRAL® Scarlet, MONASTRAL® Violet R, MONASTRAL® Red B, and MONASTRAL® Violet Maroon B. The following pigments are available from Clariant: DALAMAR® Yellow YT-858-D, Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM® Yellow HR, NOVOPERM® Yellow FGL, Hansa Brilliant Yellow 10GX, Permanent Yellow G3R-01, HOSTAPERM® Yellow H4G, HOSTAPERM® Yellow H3G, HOSTAPERM® Orange GR, HOSTAPERM® Scarlet GO, and Permanent Rubine F6B. The following pigments are available from Sun Chemical: QUINDO® Magenta, INDOFAST® Brilliant Scarlet, QUINDO® Red R6700, QUINDO® Red R6713, INDOFAST® Violet, L74-1357 Yellow, L75-1331 Yellow, L75-2577 Yellow, and LHD9303 Black. The following pigments are available from Birla Carbon: RAVEN® 7000, RAVEN® 5750, RAVEN® 5250, RAVEN® 5000 Ultra® II, RAVEN® 2000, RAVEN® 1500, RAVEN® 1250, RAVEN® 1200, RAVEN® 1190 Ultra®. RAVEN® 1170, RAVEN® 1255, RAVEN® 1080, and RAVEN® 1060. The following pigments are available from Mitsubishi Chemical Corp.: No. 25, No. 33, No. 40, No. 47, No. 52, No. 900, No. 2300, MCF-88, MA600, MA7, MA8, and MA100. The colorant may be a white pigment, such as titanium dioxide, or other inorganic pigments such as zinc oxide and iron oxide.

Specific examples of a cyan color pigment may include C.I. Pigment Blue-1, C.I. Pigment Blue-2, C.I. Pigment Blue-3, C.I. Pigment Blue-15, C.I. Pigment Blue-15:1, C.I. Pigment Blue-15:2, C.I. Pigment Blue-15:3, C.I. Pigment Blue-15:4, C.I. Pigment Blue-16, C.I. Pigment Blue-22, or C.I. Pigment Blue-60.

Specific examples of a magenta color pigment may include C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-177, C.I. Pigment Red-184, C.I. Pigment Red-202, and C.I. Pigment Violet-19.

Specific examples of a yellow pigment may include C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-138, C.I. Pigment Yellow-151, C.I. Pigment Yellow-154, and C.I. Pigment Yellow-180. While several examples have been given herein, it is to be understood that any other pigment or dye can be used that is useful in modifying the color of the UV curable ink.

Specific examples of black pigment include carbon black pigments. An example of an organic black pigment includes aniline black, such as C.I. Pigment Black 1.

As mentioned above, in some examples the inkjet ink can also include a binder. In one example, the binder can include a polyurethane binder present in a polyurethane dispersion with water. Examples of suitable polyurethanes can include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a co-polymer thereof, and a combination thereof.

In another example the binder can include a latex binder. The latex binder can be a colloidal dispersion of polymer particles in a solvent. The polymer particles of the latex binder may have several different morphologies. For example, the polymer particles may be made of a hydrophobic core surrounded by a continuous hydrophilic shell. For another example, the polymer particle morphology may resemble a raspberry, in which the hydrophobic core is surrounded by several smaller hydrophilic particles that are attached to the core. For still another example, the polymer particles may include 2, 3, or 4 particles that are at least partially attached to one another.

In the examples disclosed herein, the polymer particles of the latex binder can be heteropolymers or co-polymers. In certain examples, heteropolymers can include a more hydrophobic component and a more hydrophilic component. Examples of monomers that may be used to form the hydrophobic component include C1 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, tri methyl cyclohexyl methacrylate, t-butyl methacrylate, n-octyl methacrylate, trydecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a hydrophilic monomer, such as an acidic monomer. Examples of acidic monomers that can be polymerized in forming the polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof.

In some examples of the heteropolymers disclosed herein, the hydrophobic component(s) can make up from about 85 wt % to about 100 wt % of the polymer, and the hydrophilic component(s) can make up from about 0.1 wt % to about 15 wt % of the polymer.

In one example, the selected monomer(s) can be polymerized to form the desirable heteropolymer. Any suitable polymerization process may be used. For example, core-shell (hydrophobic-hydrophilic) polymer particles can be formed by any of a number of techniques, such as: i) grafting a hydrophilic polymer onto the surface of a hydrophobic polymer, ii) copolymerizing hydrophobic and hydrophilic monomers using ratios that lead to a more hydrophilic shell, iii) adding hydrophilic monomer (or excess hydrophilic monomer) toward the end of the copolymerization process so there is a higher concentration of hydrophilic monomer copolymerized at or near the surface, or iv) any other method suitable to generate a more hydrophilic shell relative to the core.

In certain examples the polymer particles of the latex binder can have a particle size that ranges from about 10 nm to about 300 nm.

In further examples, the glass transition temperature $T_g$ of the bulk material (e.g., the more hydrophobic portion) of the polymer particles can range from 60° C. to about 100° C. The glass transition temperature $T_g$ of the bulk material may be any temperature that enables the polymer particles to be inkjet printed without becoming too soft at the printer operating temperatures.

The weight average molecular weight of the polymer particles of the latex binder can range from about 5,000 Mw to about 500,000 Mw. In some examples, the weight average molecular weight of the polymer particles can range from about 100,000 Mw to about 500,000 Mw. In some other examples, the weight average molecular weight of the polymer particles can range from about 150,000 Mw to 300,000 Mw.

In further examples, the inkjet ink can be curable. For example, the ink can include pH stable and curable polyurethane dispersions, a photoinitiator and polymeric sensitizers.

For curable inks, a photoinitiator may be present in the inkjet composition. For example, the photoinitiator may be present in the inkjet ink composition in an amount ranging from about 0.1 wt % to about 10 wt % based on a total wt % of the inkjet ink composition.

In one example, a water soluble photoinitiator can include a trimethylbenzoylphenylphosphinic acid metal salt (i.e., TPA salt) having the following formula:

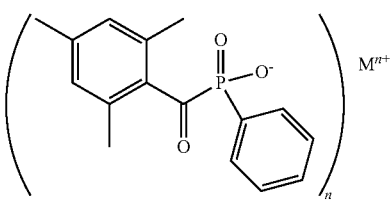

where n is any integer from 1 to 5 and M is a metal with a valence from 1 to 5. Examples of suitable metals include Li, Na, K, Cs, Rb, Be, Mg, Ca, Ba, Al, Ge, Sn, Pb, As, and Sb.

In some examples, the water soluble photoinitiator may have a water solubility of at least 0.1 wt % or at least 0.5 wt %. In some instances, the water soluble photoinitiator may have a water solubility up to about 20 wt %.

The water soluble photoinitiator may be used in combination with a sensitizer. When present, the sensitizer may be present in an amount of 0.1 wt % to about 10 wt % of the inkjet ink composition. In some examples, the sensitizer may be a water soluble polymeric sensitizer that includes a functionalized anthrone moiety, a polyether chain, and an amide linkage or an ether linkage attaching one end of the polyether chain to the functionalized anthrone moiety. The anthrone moiety may be a thioxanthrenone moiety. In one example, the curable ink can include a polymeric sensitizer having the following formula:

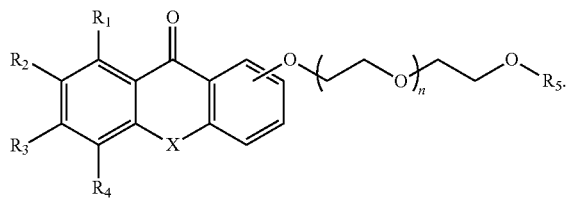

where $R_1$, $R_2$, $R_3$, $R_4$, and $R_5$ are each independently selected from a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$, or a perfluoroalkyl group. $R_d$, $R_e$, and $R_f$ can each independently be selected from a hydrogen atom, a substituted or unsubstituted alkyl group, a substituted or unsubstituted allyl group, a substituted or unsubstituted alkene or alkenyl group, a substituted or unsubstituted aryl group, or a substituted or unsubstituted aralkyl group. Some examples of suitable alkyl groups include methyl, ethyl, propyl, isopropyl, butyl, isobutyl, pentyl, hexyl, etc. One example of a suitable alkene group is an ethylene group. Some examples of suitable aryl groups include phenyl, phenylmethyl, etc. In the formula above, X can be O, S, or NH and the polyether chain can have n number of repeating monomer units, where n ranges from 1 to 200.

In further examples, curable inkjet inks can include a particular reactive polyurethane dispersion having polymer strands with acrylate or methacrylate reactive groups in capping units at the ends of the strands. In some examples, the reactive polyurethane dispersion can include a polymer strand that has a polymer backbone having two ends terminating at a first capping unit and a second capping unit. The polymer backbone can be formed of polymerized monomers including: a reactive diol selected from an acrylate-containing diol, a methacrylate-containing diol, or combination thereof; and a blend of two or more diisocyanates. The first capping unit can be an acrylate-containing or methacrylate-containing monoalcohol reacted with an isocyanate group of one of the diisocyanates. The second capping unit can be an ionic stabilizing group. The polymer backbone can be devoid of ionic stabilizing groups. In certain examples, the reactive polyurethane dispersion can have an NCO/OH ratio of 1.2 to 10, an acid number of 20 to 100, and/or a double bond density of 1.5 to 10.

In another example, a reactive polyurethane dispersion can include a polymer strand that has a polymer backbone having two ends terminating at a first capping unit and a second capping unit. The polymer backbone can be formed of polymerized monomers including: a blend of two or more diisocyanates, and a reactive diol selected from:

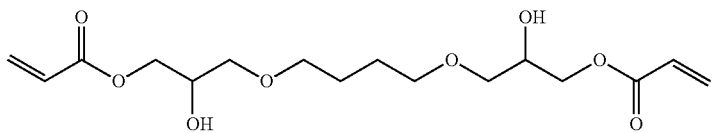

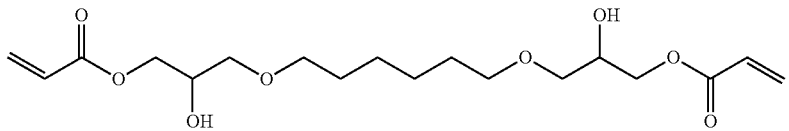

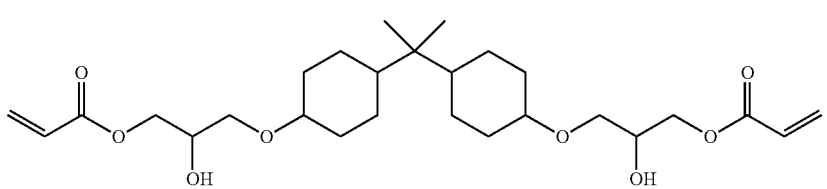

-continued

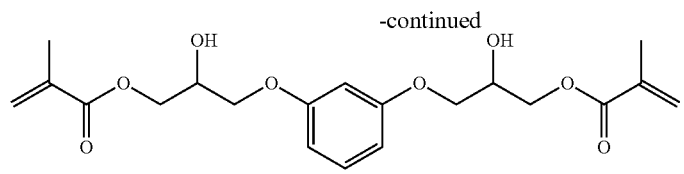

or a combination thereof. The first capping unit can be an acrylate-containing monoalcohol or a methacrylate-containing monoalcohol reacted with an isocyanate group of one of the two or more diisocyanates. The second capping unit can be an ionic stabilizing group.

Such reactive polyurethane dispersions can be used in the inkjet ink to provide a curable inkjet ink that can be used to print especially durable images using the transfer printing processes described herein. In various examples, curable inkjet inks can include the reactive polyurethane dispersions, photoinitiators, and/or sensitizers described above.

In further examples, the inkjet inks described herein can be printed using an inkjet printing system that includes an intermediate transfer member. An inkjet printhead can be positioned to jet the inkjet ink onto the intermediate transfer member. The ink can then be transferred onto a print medium. Generally, the intermediate transfer member can have a non-absorbent surface such as a rubber blanket onto which the ink can be printed. The surface of the intermediate transfer member can be formed of a material having a relatively low surface energy to facilitate transfer of the ink image from the surface of the intermediate transfer member to the print medium. Non-limiting examples of such materials can include silicones, fluoro-silicones, synthetic rubbers with fluoropolymer elastomer such as Viton® synthetic rubber (The Chemours Company), and so on.

In still further examples, the intermediate transfer member can be heated to dry the ink printed onto the intermediate transfer member. This can be accomplished by an internal heater integrated in the intermediate transfer member or by an external heater positioned near the intermediate transfer member.

Figure 5:
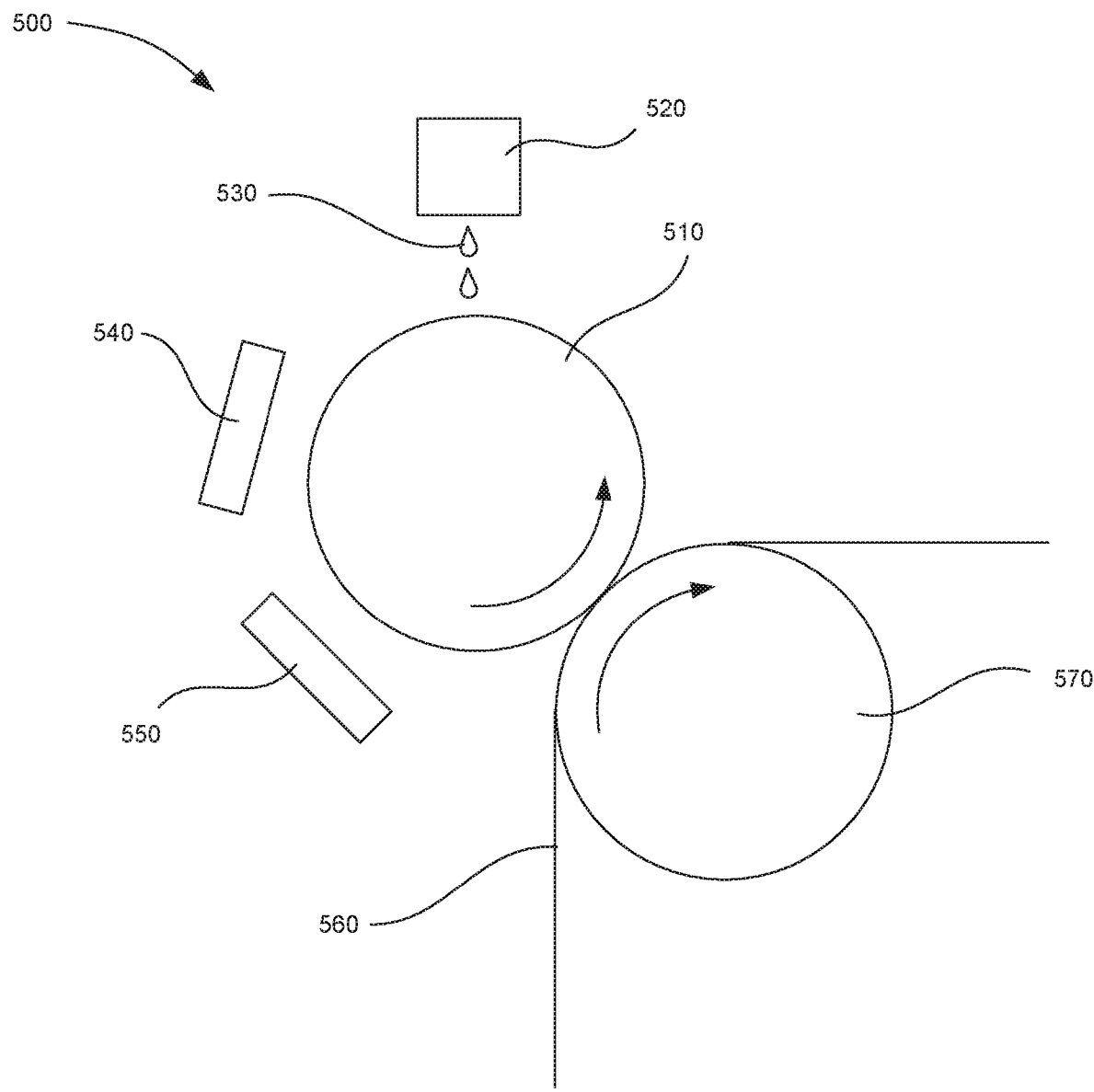
FIG. 5 is a schematic of an example inkjet printing system in accordance with the present disclosure.

FIG. 5 is a schematic of an example inkjet printing system 500. The system includes an intermediate transfer member 510 and an inkjet printhead 520 positioned to jet an inkjet ink 530 onto the intermediate transfer member. The intermediate transfer can rotate so that ink printed onto the surface of the intermediate transfer member passes under a heater 540 to dry the ink. The example shown in this figure also includes a UV curing unit 550 positioned to cure the ink. The dried and cured ink can then be transferred onto a print medium 560 which is fed between the intermediate transfer member and an impression roller 570. In another example, the system can include a UV curing unit positioned to cure the ink after the ink has been transferred onto the print medium.

Figure 6:
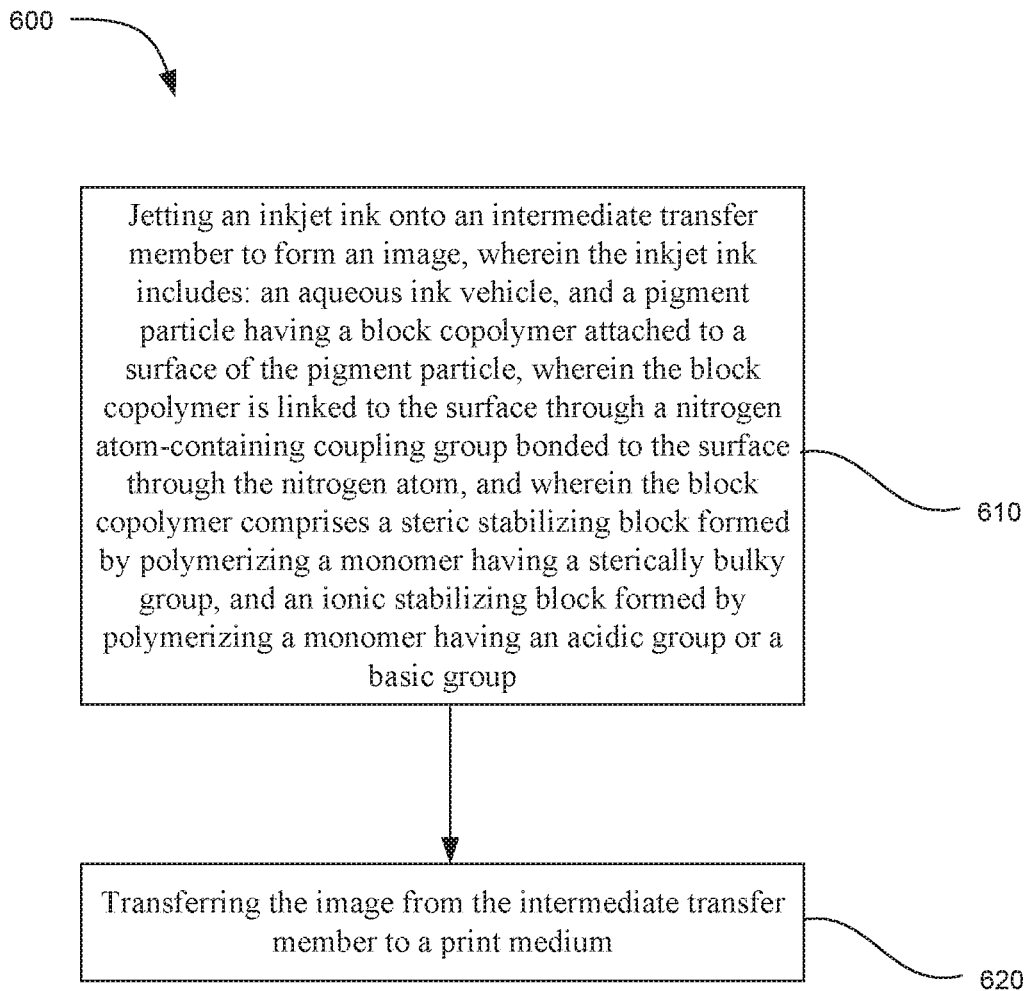
FIG. 6 is a flowchart of an example method of inkjet printing in accordance with the present disclosure.

FIG. 6 shows a flowchart of an example method 600 of inkjet printing. The method includes jetting an inkjet ink onto an intermediate transfer member to form an image 610, wherein the inkjet ink includes: an aqueous ink vehicle, and a pigment particle having a block copolymer attached to a surface of the pigment particle, wherein the block copolymer is linked to the surface through a nitrogen atom-containing coupling group bonded to the surface through the nitrogen atom, and wherein the block copolymer includes a steric stabilizing block formed by polymerizing a monomer having a sterically bulky group, and an ionic stabilizing block formed by polymerizing a monomer having an acidic group or a basic group. The method also includes transferring the image from the intermediate transfer member to a print medium 620. In another example, the method can also include heating the intermediate transfer member to dry the image.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "curable" and "UV-curable" refers to compositions that can be cured by exposure to ultraviolet light from any UV source such as a mercury vapor lamp, UV LED source, or the like. Mercury vapor lamps emit high intensity light at wavelengths from 240 nm to 270 nm and 350 nm to 380 nm. "LED curable" refers to compositions that can be cured either by ultraviolet light from an ultraviolet LED. Ultraviolet LEDs emit light at specific wavelengths. For example, ultraviolet LEDs are available at 365 nm and 395 nm wavelengths, among others.

As used herein, "liquid vehicle" or "ink vehicle" refers to a liquid fluid in which colorant is placed to form an ink. A wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily describes the use of pigment colorants, the term "pigment" can be used more generally to describe not only pigment colorants, but other pigments such as organometallics, ferrites, ceramics, etc. In one specific example, however, the pigment is a pigment colorant.

As used herein, "ink-jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

Figure 7:
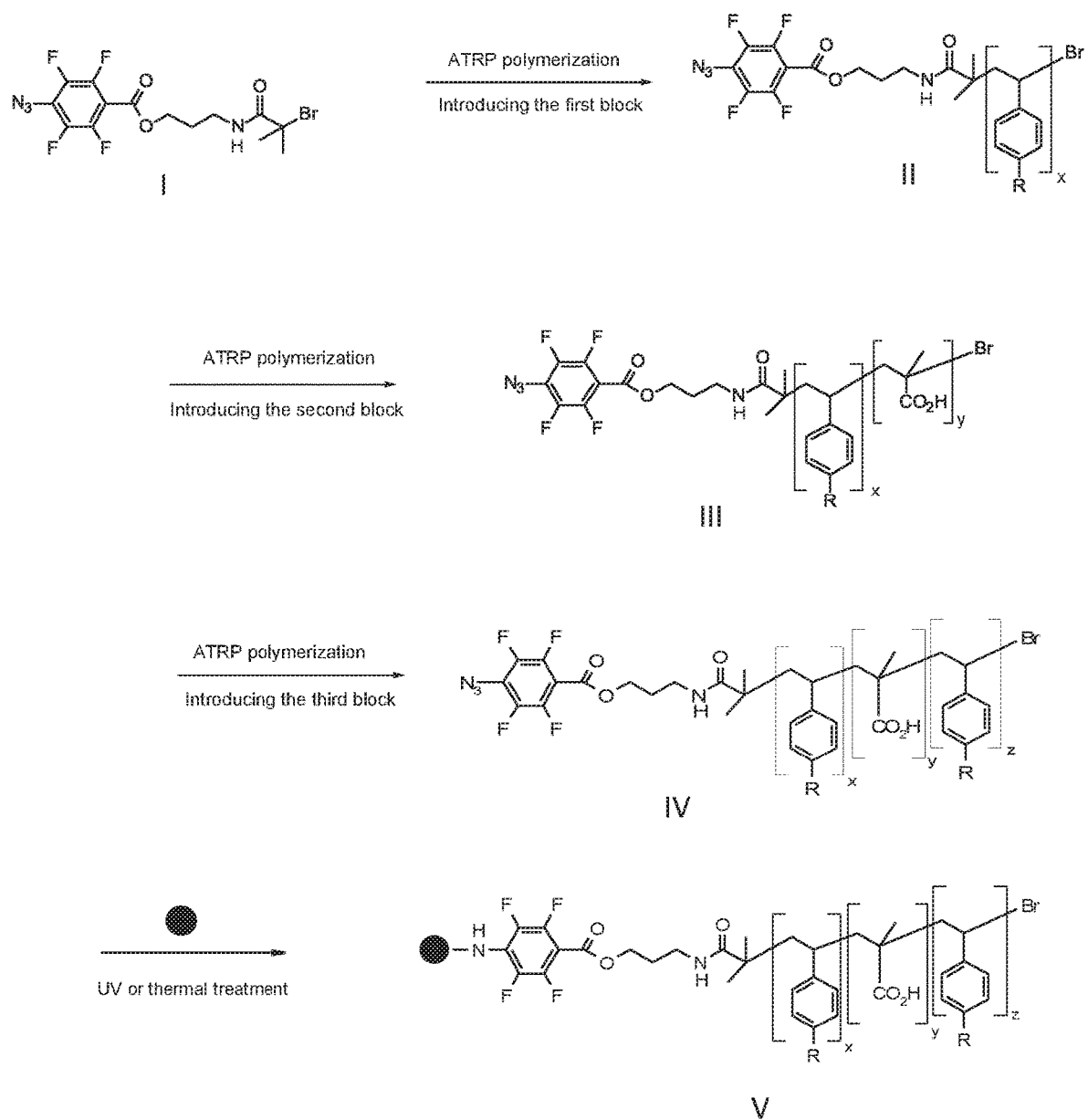
FIG. 7 is an example reaction scheme for forming a block copolymer attached to a pigment particle in accordance with the present disclosure.
Figure 8:
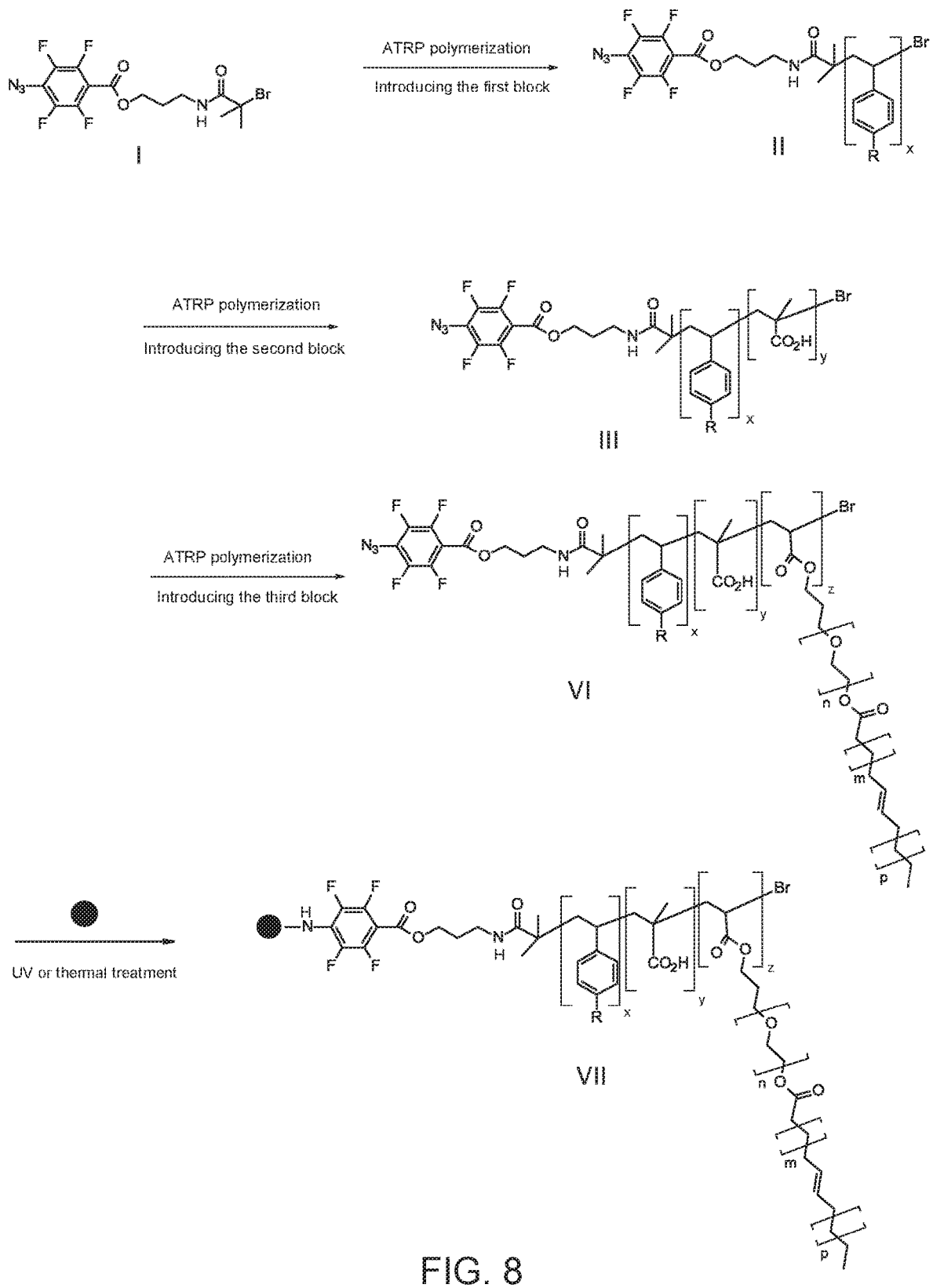
FIG. 8 is an example reaction scheme for forming a block copolymer attached to a pigment particle in accordance with the present disclosure.
Figure 9:
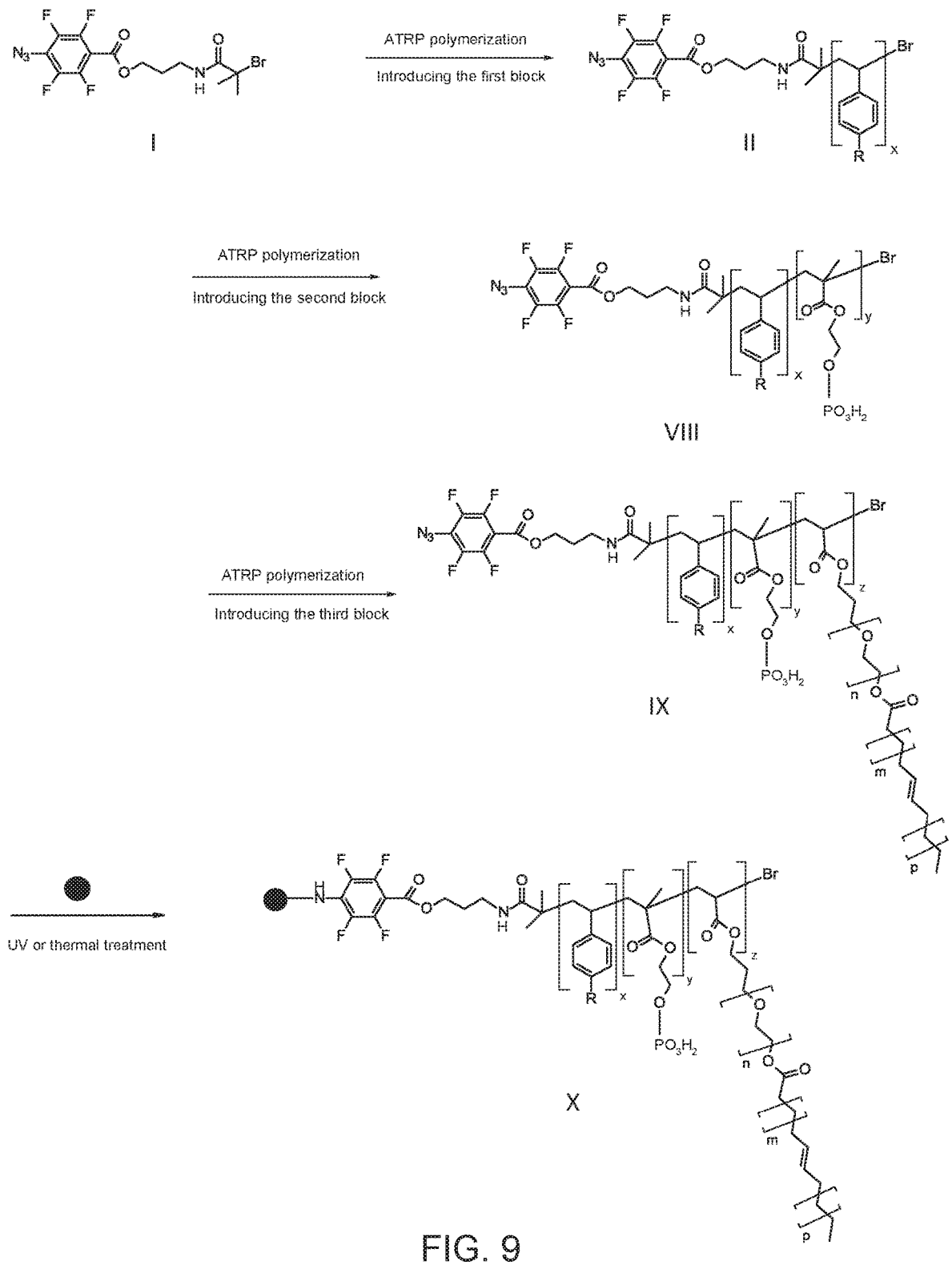
FIG. 9 is an example reaction scheme for forming a block copolymer attached to a pigment particle in accordance with the present disclosure.
Figure 10:
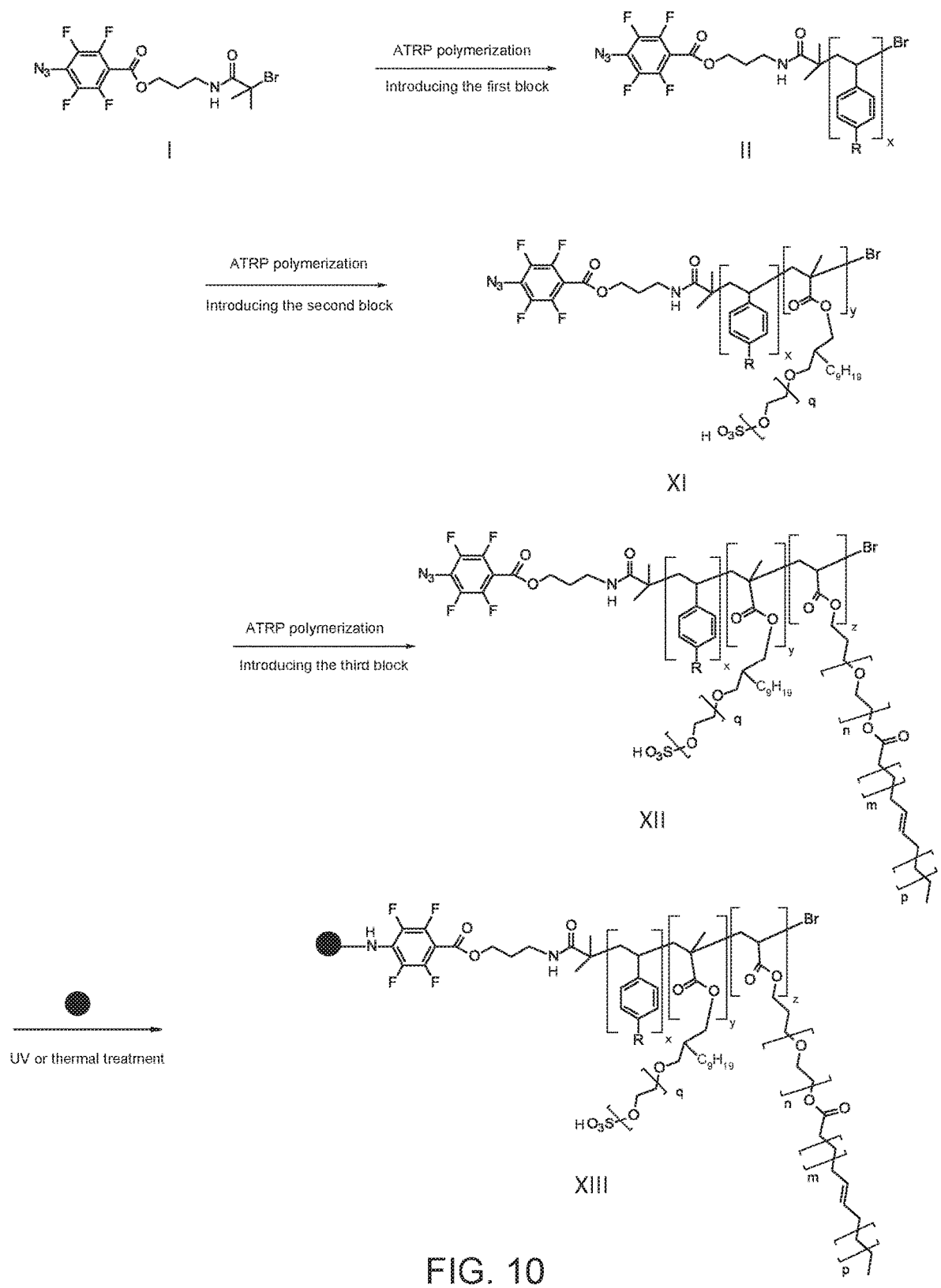
FIG. 10 is an example reaction scheme for forming a block copolymer attached to a pigment particle in accordance with the present disclosure.
Figure 11:
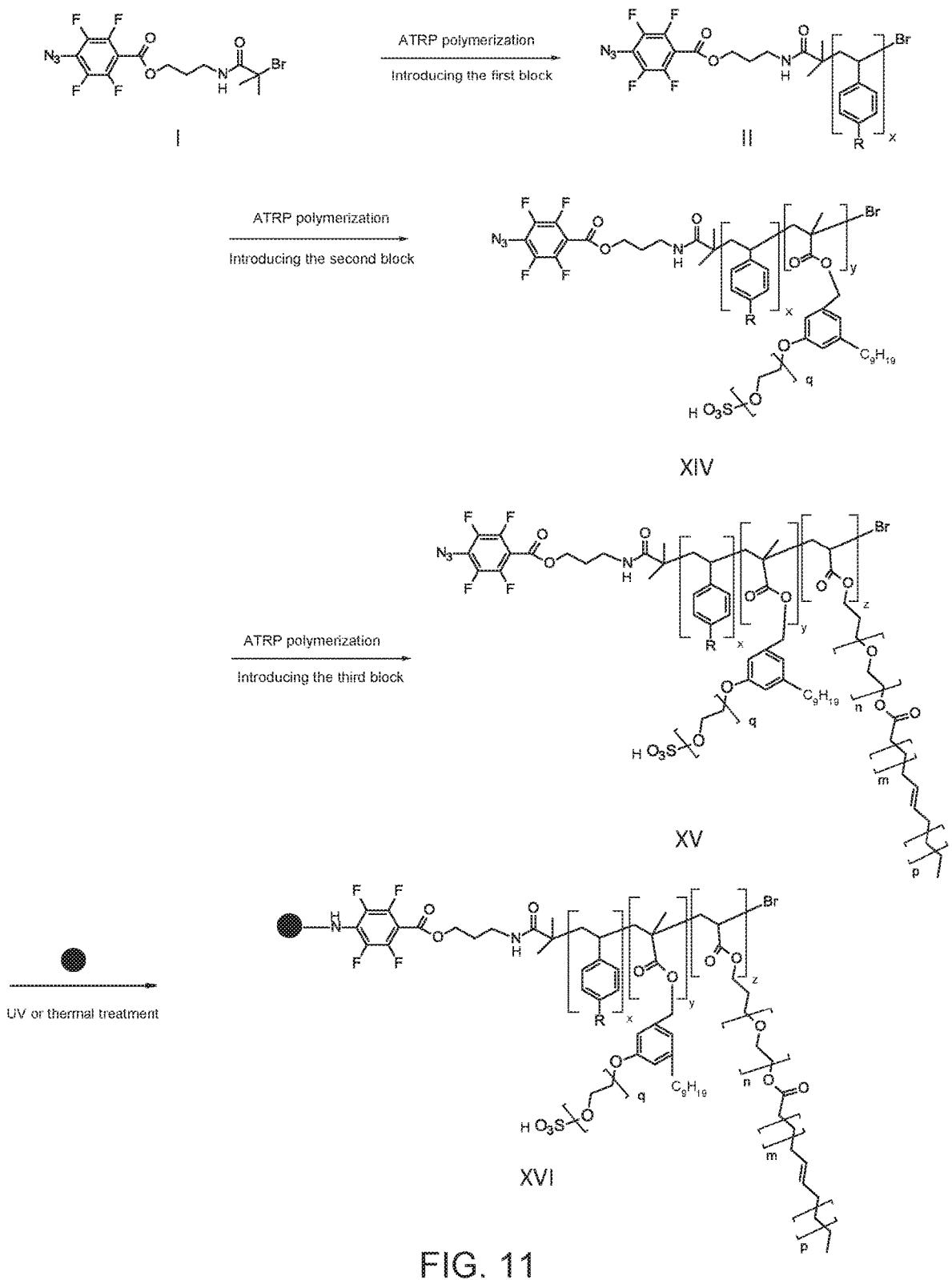
FIG. 11 is an example reaction scheme for forming a block copolymer attached to a pigment particle in accordance with the present disclosure.
Figure 12:
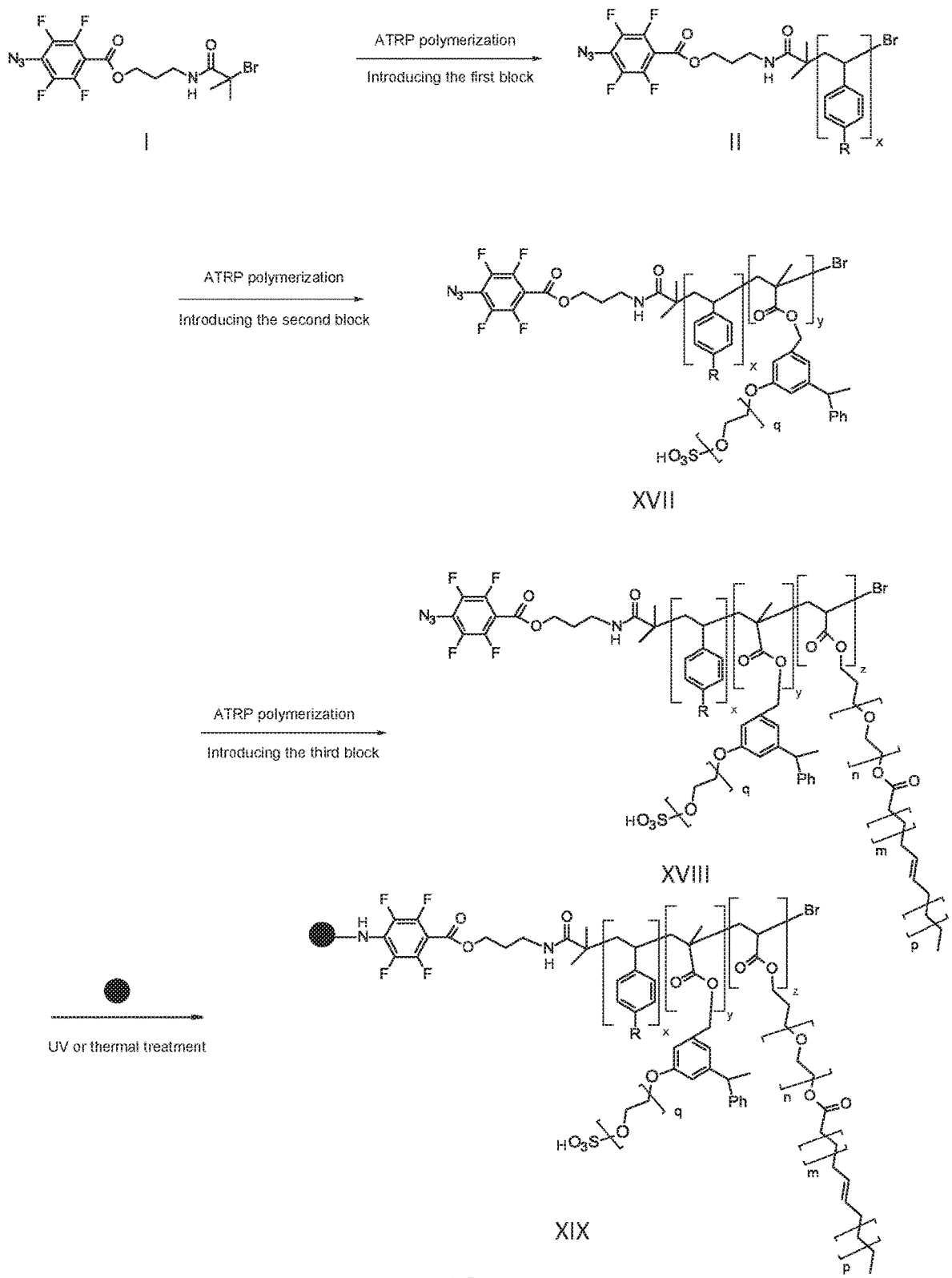
FIG. 12 is an example reaction scheme for forming a block copolymer attached to a pigment particle in accordance with the present disclosure.

FIG. 7 shows a reaction scheme for forming a block copolymer grafted pigment particle in accordance with one example. In this example, R represents a sterically bulky group, which helps to increase the solubility of the polymer and stabilize the nano-composite material. R can be any alkyl groups, alkoxy groups, branched alkyl groups or branched alkoxy groups. X, y and z are integers between 1 and about 5,000. (edit this description) The block copolymer in this example is a polyacrylic acid and polystyrene based tri-block co-polymer. A tetrafluorophenyl azide coupling agent (I) undergoes the first polymerization with the first block monomer, substituted styrene, to give the first block polystyrene tetrafluorophenyl azide living polymer (II). Living polymer (II) undergoes the second polymerization with the second block monomer, acrylic acid, to give a two-block polystyrene and polyacrylic acid tetrafluorophenyl living polymer (III). Living polymer (III) undergoes the third polymerization with the third block monomer, substituted styrene, to give a three-block polystyrene, polyacrylic acid and polystyrene tetrafluorophenyl azide polymer (IV). A coupling reaction of an inorganic or organic pigment with the three-block polystyrene, polyacrylic acid and polystyrene tetrafluorophenyl azide polymer (IV) upon UV irradiation gives a functionalized tri-block copolymer grafted pigment (V).

Example 2-6

Additional block copolymer grafted pigment particles are made using the reaction schemes shown in FIGS. 8-12. In each example, the coupling agent (I) is reacted with a series of three monomers to form tri-block copolymers, which are then grafted to pigment particles. In each of these figures, R represents a sterically bulky group, which helps to increase the solubility of the polymer and stabilize the nano-composite material. R can be any alkyl groups, alkoxy groups, branched alkyl groups and branched alkoxy groups. X, y and z are an integer between 1 and about 5,000. The letters n, m, p, and q represent integers between 1 and 500.

Example 7

An inkjet ink is prepared using any of the block copolymer grafted pigment particles of Examples 1-6. The inkjet ink includes the block copolymer grafted pigment in an amount from 2 to 10 wt %. The inkjet ink also includes: 0.1 to 1.5 wt % of an anti-kogation agent such as a Crodafos® anti-kogation agent (Croda Inc.); 0.1 to 2 wt % of an antimicrobial agent such as 5-chloro-2-methyl-isothiazoline-3-one (CIT), 2-methyl-4-isothiazoline-3-One (OMIT), 2-octyl-4-isothiazolin-3-one (OZT), 4,5-dichloro-2-octyl-4-isothiazolin-3-one (DCOIT), or 1,2-benzisothiazolin-3-one (BIT); and the balance water.

While the present technology has been described with reference to certain examples, various modifications, changes, omissions, and substitutions can be made without departing from the spirit of the disclosure. It is intended, therefore, that the disclosure be limited only by the scope of the following claims.

What is claimed is:

1. An inkjet ink, comprising:
   an aqueous ink vehicle; and
   a pigment particle having a block copolymer attached to a surface of the pigment particle, wherein the block copolymer is linked to the surface through a nitrogen atom-containing coupling group bonded to the surface through the nitrogen atom, and wherein the block copolymer comprises:
   a steric stabilizing block formed by polymerizing a monomer having a sterically bulky group, and
   an ionic stabilizing block formed by polymerizing a monomer having an acid group or a base group.

2. The inkjet ink of claim 1, wherein the block copolymer is a diblock copolymer comprising an inner ionic stabilizing group and an outer steric stabilizing group.

3. The inkjet ink of claim 1, wherein the block copolymer is a triblock copolymer comprising an inner steric stabilizing group, a middle ionic stabilizing group, and an outer steric stabilizing group.

4. The inkjet ink of claim 1, wherein the block copolymer linked to the nitrogen atom-containing coupling group has general formula 1, general formula 2, or general formula 3, as shown below:

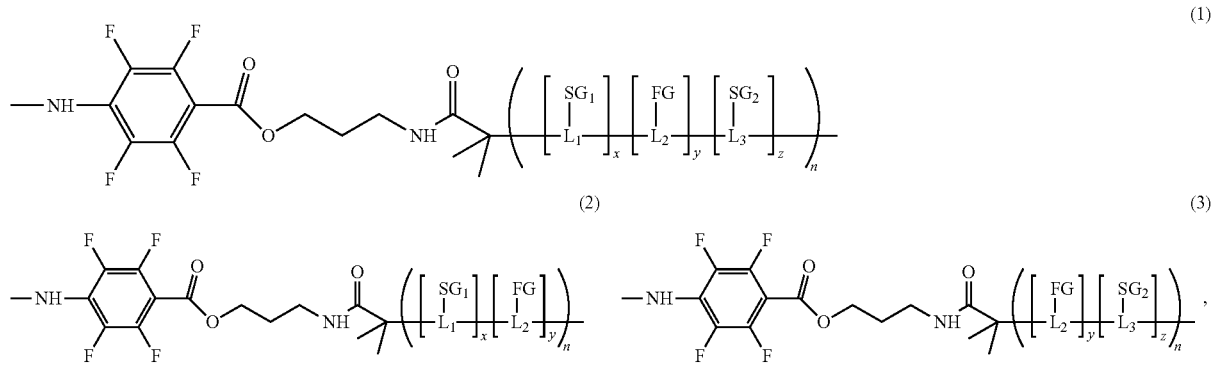

wherein:

$L_1$, $L_2$, and $L_3$ are each independently a covalent bond or chemical structure providing a covalent bond between different blocks selected from C—C, C=C, or C—N;

$SG_1$ and $SG_2$ each independently represent a solubilizing and sterically bulky group, which helps to increase the solubility of the polymer and stabilize the colorant particles, selected from alkyl groups, alkoxy groups, branched alkyl groups, branched alkoxy groups, aliphatic esters, branched aliphatic esters, substituted phenyl groups, or macromolecular monomers;

FG represents a functional group that provides charging sites to pigment surfaces, selected from acidic functional groups and basic groups; and x, y and z are each independently an integer from 1 to about 5,000; and n is an integer from 1 to about 100.

5. The inkjet ink of claim 1, wherein the monomer of the ionic stabilizing block comprises an acidic or basic group that is a hydroxyl, a carboxylate, a sulfonic acid, a phosphonic acid, a phosphorous acid, a primary amine, a secondary amine, a tertiary amine, pyridine, or imidazoline.

6. The inkjet ink of claim 1, wherein the monomer of the steric stabilizing block is

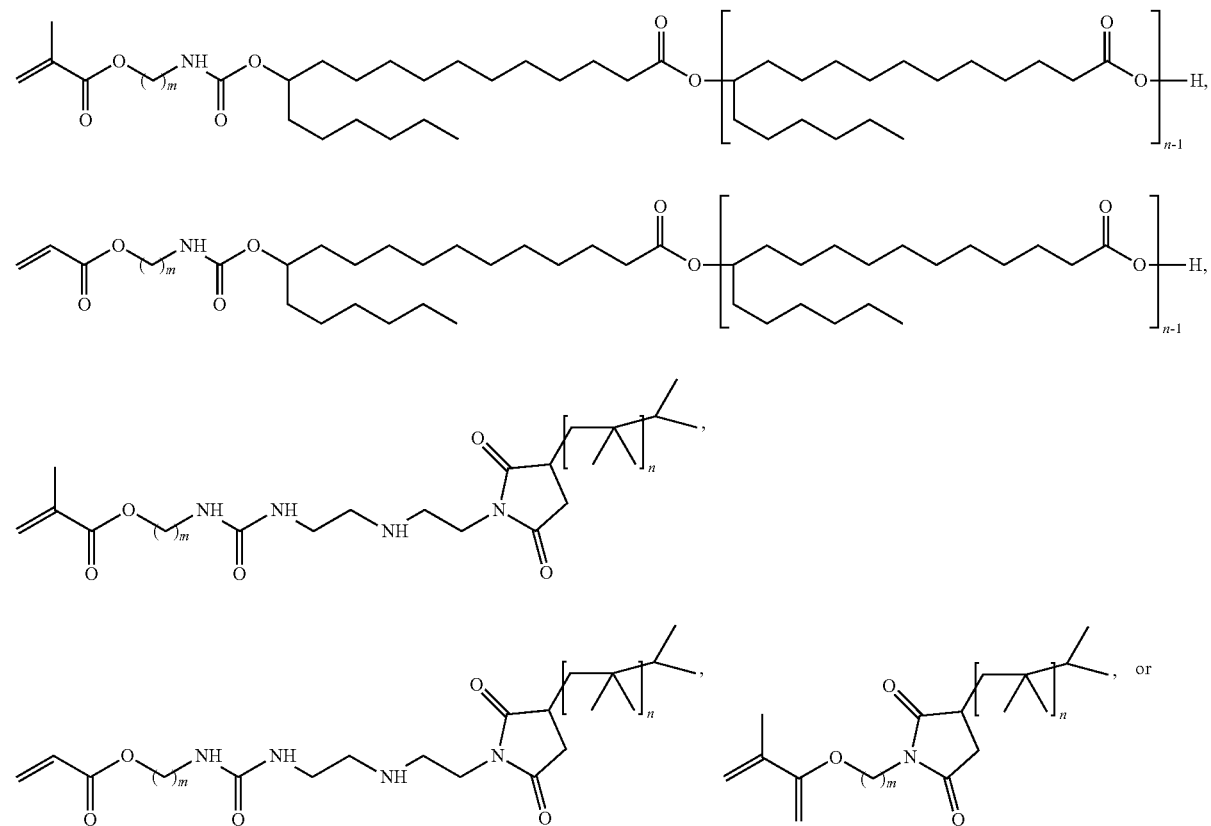

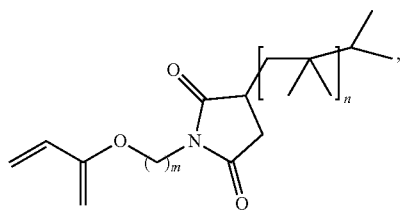

where m is an integer from 1 to 10 and n is an integer from 1 to 500.

7. The inkjet ink of claim 1, wherein the monomer of the steric stabilizing block is

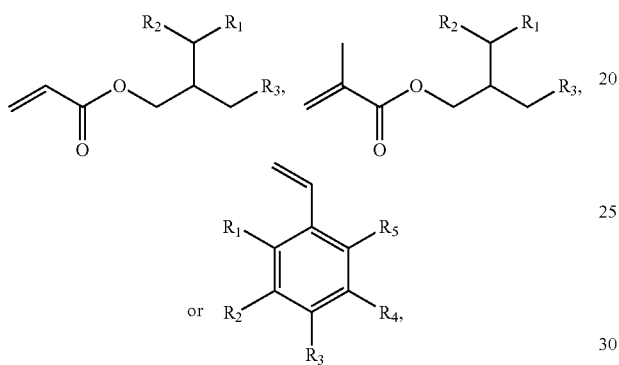

where $R_1$, $R_2$, $R_3$, $R_4$, and $R_5$ are independently alkyl groups, alkoxy groups, branched alkyl groups, branched alkoxy groups, or substituted aryl groups.

8. The inkjet ink of claim 1, further comprising a binder.

9. The inkjet ink of claim 8, wherein the binder comprises a polyurethane dispersion or a latex dispersion.

10. The inkjet ink of claim 8, wherein the binder is curable with ultraviolet radiation and further comprises a photo initiator.

11. An inkjet printing system, comprising:
an intermediate transfer member;
an inkjet ink, comprising:
  an aqueous ink vehicle, and
  a pigment particle having a block copolymer attached to a surface of the pigment particle, wherein the block copolymer is linked to the surface through a nitrogen atom-containing coupling group bonded to the surface through the nitrogen atom, and wherein the block copolymer comprises a steric stabilizing block formed by polymerizing a monomer having a sterically bulky group, and an ionic stabilizing block formed by polymerizing a monomer having an acidic group or a basic group; and
an inkjet printhead positioned to jet the inkjet ink onto the intermediate transfer member.

12. The inkjet printing system of claim 11, wherein the intermediate transfer member comprises a non-absorbent surface on which the inkjet ink is printed.

13. The inkjet printing system of claim 11, wherein the intermediate transfer member is heated.

14. A method of inkjet printing, comprising:
jetting an inkjet ink onto an intermediate transfer member to form an image, wherein the inkjet ink comprises:
  an aqueous ink vehicle, and
  a pigment particle having a block copolymer attached to a surface of the pigment particle, wherein the block copolymer is linked to the surface through a nitrogen atom-containing coupling group bonded to the surface through the nitrogen atom, and wherein the block copolymer comprises a steric stabilizing block formed by polymerizing a monomer having a sterically bulky group, and an ionic stabilizing block formed by polymerizing a monomer having an acidic group or a basic group; and
transferring the image from the intermediate transfer member to a print medium.

15. The method of claim 14, further comprising heating the intermediate transfer member to dry the image.

* * * * *